US012109799B2

(12) United States Patent
Takeda et al.

(10) Patent No.: US 12,109,799 B2
(45) Date of Patent: Oct. 8, 2024

(54) PRINTER, CONTROL METHOD, AND NON-TRANSITORY COMPUTER READABLE MEDIUM

(71) Applicant: BROTHER KOGYO KABUSHIKI KAISHA, Nagoya (JP)

(72) Inventors: Kengo Takeda, Tokai (JP); Akihiro Kobayashi, Yokkaichi (JP); Takahiro Nishimoto, Ogaki (JP); Kosuke Nukui, Nagoya (JP); Kenta Hasebe, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/809,335

(22) Filed: Jun. 28, 2022

(65) Prior Publication Data

US 2023/0001711 A1 Jan. 5, 2023

(30) Foreign Application Priority Data

Jun. 30, 2021 (JP) ................................ 2021-109088

(51) Int. Cl.
*B41J 11/00* (2006.01)

(52) U.S. Cl.
CPC ............................... *B41J 11/00214* (2021.01)

(58) Field of Classification Search
CPC .............. B41J 11/00214; B41J 11/0021; B41J 11/00212; B41J 3/543
See application file for complete search history.

(56) References Cited

U.S. PATENT DOCUMENTS

| | | | |
|---|---|---|---|
| 6,902,249 B2 | 6/2005 | Suzuki et al. |
| 7,794,077 B2 | 9/2010 | Falser et al. |
| 10,723,136 B2 | 7/2020 | Kayanaka et al. |
| 2006/0158481 A1 | 7/2006 | Spevak et al. |

(Continued)

FOREIGN PATENT DOCUMENTS

| | | |
|---|---|---|
| JP | 2012-51160 A | 3/2012 |
| JP | 2012-232529 A | 11/2012 |

(Continued)

OTHER PUBLICATIONS

Non-Final Office Action issued Feb. 8, 2024 to U.S. Appl. No. 17/809,422.

*Primary Examiner* — Bradley W Thies
(74) *Attorney, Agent, or Firm* — KENEALY VAIDYA LLP

(57) ABSTRACT

A printer includes a platen, a first head, a second head, and an illumination device. In a normal print mode, the first head, the second head, and the illumination device are moved relatively with respect to the platen in a main scanning direction, in a state in which a distance between the platen and a predetermined position of the illumination device in the height direction is a first distance, and the ink is ejected onto an object to be printed placed on the platen and the light is irradiated onto the ejected ink. In a gloss print mode, the first head, the second head, and the illumination device are moved relatively with respect to the platen in the main scanning direction, in a state in which the distance between the platen and the predetermined position in the height direction is a second distance larger than the first distance.

12 Claims, 25 Drawing Sheets

(56) References Cited

U.S. PATENT DOCUMENTS

| | | | |
|---|---|---|---|
| 2011/0074857 | A1 | 3/2011 | Mitsuzawa |
| 2012/0281049 | A1 | 11/2012 | Kachi |
| 2012/0287190 | A1 | 11/2012 | Shimada |
| 2013/0235135 | A1 | 9/2013 | Kondo et al. |
| 2017/0072706 | A1* | 3/2017 | Okawa ....................... B41J 2/01 |
| 2018/0257389 | A1 | 9/2018 | Hasegawa |

FOREIGN PATENT DOCUMENTS

| | | | |
|---|---|---|---|
| JP | 2013-184400 | A | 9/2013 |
| JP | 2013-188962 | A | 9/2013 |
| JP | 2015-63057 | A | 4/2015 |
| JP | 2015-186918 | A | 10/2015 |
| JP | 2015-193089 | A | 11/2015 |
| JP | 2020-175563 | A | 10/2020 |
| JP | 2022184195 | A | 12/2022 |

* cited by examiner

PRINTER, CONTROL METHOD, AND NON-TRANSITORY COMPUTER READABLE MEDIUM

CROSS-REFERENCE TO RELATED APPLICATIONS

This application claims priority to Japanese Patent Application No. 2021-109088, filed on Jun. 30, 2021, the content of which is hereby incorporated by reference in its entirety.

BACKGROUND

The present disclosure relates to a printer, a control method, and a non-transitory computer readable medium storing a control program.

A printer is known that performs gloss printing using photocurable ink. The gloss printing is a printing method that creates a glossy printed object, by smoothing a layer of the photocurable ink formed on an object to be printed. For example, in the known printer, a color ink head, a clear ink head, a plurality of color LEDs, and a plurality of white/clear LEDs are provided on a carriage. The color ink head and the clear ink head are aligned with each other in a sub-scanning direction, and respectively eject photocurable color ink and photocurable clear ink onto the object to be printed. The plurality of color LEDs are arranged in the plurality thereof on both sides of the color ink head in a main scanning direction, and irradiate light onto the object to be printed. The plurality of white/clear LEDs are arranged in the plurality thereof on both sides of the clear ink head in the main scanning direction, and irradiate light onto the object to be printed.

At the time of the gloss printing, the printer ejects the color ink from the color ink head onto the object to be printed and causes the plurality of color LEDs to be illuminated, while moving the carriage in the main scanning direction. The printer ejects the clear ink from the clear ink head onto the object to be printed and causes the plurality of clear LEDs to be illuminated. The printer conveys the object to be printed in a direction from the color ink head toward the clear ink head in the sub-scanning direction. By repeating these operations, the printer forms a layer of color ink on the object to be printed, and forms a layer of clear ink on the layer of color ink.

SUMMARY

At the time of the gloss printing, in order to secure a time from when the clear ink layer is formed on the object to be printed to when the smoothing is performed, the above-described printer causes only the white/clear LEDs furthermost upstream in a progress direction of the carriage in the main scanning direction to be illuminated, of the plurality of white/clear LEDs.

Note that, in the above-described printer, when the clear ink layer is not formed on the color ink layer, for example, it is conceivable to perform the gloss printing by smoothing the color ink layer. In this case also, in a similar manner to the white/clear LEDs, in order to secure a time from when the color ink layer is formed on the object to be printed to when the smoothing is performed, it is conceivable that the printer causes only the color LEDs furthermost upstream in the progress direction of the carriage in the main scanning direction to be illuminated, of the plurality of color LEDs.

When performing these modes of the gloss printing, in a first scan, depending on how the ink is cured at a boundary between a region, of the ink layers of the clear ink, the color ink, and the like, that is irradiated with the light and a region that is not yet irradiated, there is a case in which a striped pattern occurs in the ink layers of the clear ink, the color ink, and the like. As a result, a deterioration in print quality could occur.

An object of the present disclosure is to provide a printer, a control method, and a non-transitory computer readable medium storing a computer-readable control program capable of suppressing, in a gloss print mode, the occurrence of a striped pattern in an ink layer and improving print quality.

According to a first aspect of the present disclosure a printer includes a platen, a first head, a second head, an illumination device, a processor, and a memory. The platen is configured to have an object to be printed placed thereon. The first head is configured to eject a first ink onto the object to be printed. The first ink is a photocurable ink. The second head is configured to eject a photocurable second ink onto the object to be printed. The illumination device is aligned with the first head and the second head in a main scanning direction, and includes a light source that is configured to irradiate light onto the object to be printed. The memory stores computer-readable instructions that, when executed by the processor, instruct the processor to perform following processes. In a normal print mode, the processor causes the first head, the second head, and the illumination device to move relatively with respect to the platen in the main scanning direction, in a state in which, in a height direction, a distance between the platen and a predetermined position of the illumination device in the height direction is a first distance. The height direction is orthogonal to the main scanning direction. The processor causes one or both of the first head and the second head to eject the ink onto the object to be printed, while the first head, the second head, and the illumination device are moving in the normal print mode. The processor causes the light source to irradiate the light onto the ink ejected onto the object to be printed, while the first head, the second head, and the illumination device are moving in the normal print mode. In a gloss print mode different from the normal print mode, the processor causes the first head, the second head, and the illumination device to move relatively with respect to the platen in the main scanning direction, in a state in which the distance between the platen and the predetermined position in the height direction is a second distance larger than the first distance. The processor causes one or both of the first head and the second head to eject the ink onto the object to be printed while the first head, the second head, and the illumination device are moving in the gloss print mode in the gloss print mode. The processor causes the light source to illuminate the light onto the ink ejected onto the object to be printed in the gloss print mode.

According to a second aspect of the present disclosure, a control method for controlling a printer including a platen configured to have an object to be printed placed thereon, a first head configured to eject a first ink onto the object to be printed, the first ink being a photocurable ink, a second head configured to eject a photocurable second ink onto the object to be printed, and an illumination device aligned with the first head and the second head in a main scanning direction and including a light source configured to irradiate light onto the object to be printed, includes following steps. Moving the first head, the second head, and the illumination device relatively with respect to the platen in the main scanning direction in a normal print mode, in a state in which, in a height direction, a distance between the platen and a predetermined position of the illumination device in the height direction is a first distance. The height direction is orthogonal to the main scanning direction. Ejecting the ink onto the object to be printed from one or both of the first head and the second head, while the first head, the second head, and the illumination device are moving in the normal print mode. Irradiating the light from the light source onto the ink ejected onto the object to be printed, while the first head, the second head, and the illumination device are moving in the normal print mode. Moving the first head, the second head, and the illumination device relatively with respect to the platen in the main scanning direction in a gloss print mode, in a state in which the distance between the platen and the predetermined position in the height direction is a second distance larger than the first distance. The gloss print mode is different from the normal print mode. Ejecting the ink onto the object to be printed from one or both of the first head and the second head while the first head, the second head, and the illumination device are moving in the gloss print mode. Irradiating the light from the light source onto the ink ejected onto the object to be printed, while the first head, the second head, and the illumination device are moving in the gloss print mode.

According to a third aspect of the present disclosure, a non-transitory computer readable medium storing computer-readable instructions that are executed by a processor provided in a printer including a platen configured to have an object to be printed placed thereon, a first head configured to eject a first ink onto the object to be printed, the first ink being a photocurable ink, a second head configured to eject a photocurable second ink onto the object to be printed, and an illumination device aligned with the first head and the second head in a main scanning direction and including a light source configured to irradiate light onto the object to be printed, the computer-readable instructions instructs the processor to perform following processes. The processor causes the first head, the second head, and the illumination device to move relatively with respect to the platen in the main scanning direction in a normal print mode, in a state in which, in a height direction, a distance between the platen and a predetermined position of the illumination device in the height direction is a first distance. The height direction is orthogonal to the main scanning direction. The processor causes one or both of the first head and the second head to eject the ink onto the object to be printed while the first head, the second head, and the illumination device are moving in the normal print mode. The processor causes the light source to irradiate the light onto the ink ejected onto the object to be printed, while the first head, the second head, and the illumination device are moving in the normal print mode. The processor causes the first head, the second head, and the illumination device to move relatively with respect to the platen in the main scanning direction in a gloss print mode, in a state in which the distance between the platen and the predetermined position in the height direction is a second distance. The second distance is larger than the first distance. The gloss print mode is different from the normal print mode. The processor causes one or both of the first head and the second head to eject the ink onto the object to be printed while the first head, the second head, and the illumination device are moving in the gloss print mode. The processor causes the light source to irradiate the light onto the ink ejected onto the object to be printed, while the first head, the second head, and the illumination device are moving in the gloss print mode.

According to each of the above-described aspects, in the gloss print mode, the printer can suppress the occurrence of the striped pattern in layers formed by the first ink or the second ink, and can improve print quality.

BRIEF DESCRIPTION OF THE DRAWINGS

Embodiments will be described below in detail with reference to the accompanying drawings in which.

DETAILED DESCRIPTION

A printer 1A according to an embodiment of the present disclosure will be described with reference to FIG. 1 to FIG. 13. The upper side, the lower side, the lower left side, the upper right side, the lower right side, and the upper left side in FIG. 1 respectively correspond to the upper side, the lower side, the front side, the rear side, the right side, and the left side of the printer 1A.

In the following description, a white color ink will be referred to as "white ink." When black, cyan, yellow, and magenta inks are collectively referred to, or when no particular distinction is made therebetween, they will be referred to as "color inks." Transparent or translucent ink will be referred to as "clear ink." When the white ink, the color inks, and the clear ink are collectively referred to, or no particular distinction is made therebetween, they will simply be referred to as "inks."

Figure 1:
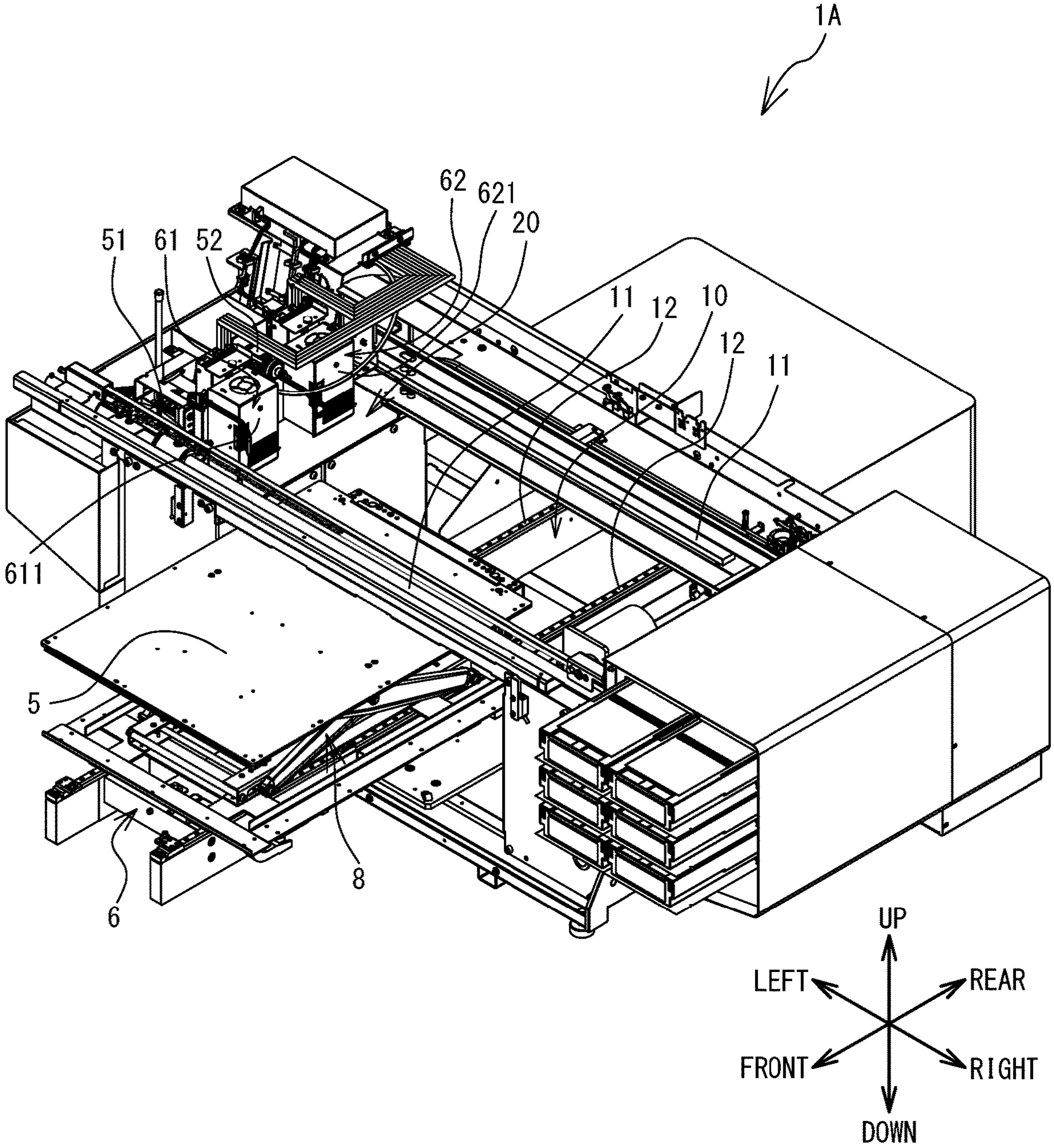
FIG. 1 is a perspective view of a printer.
Figure 2:
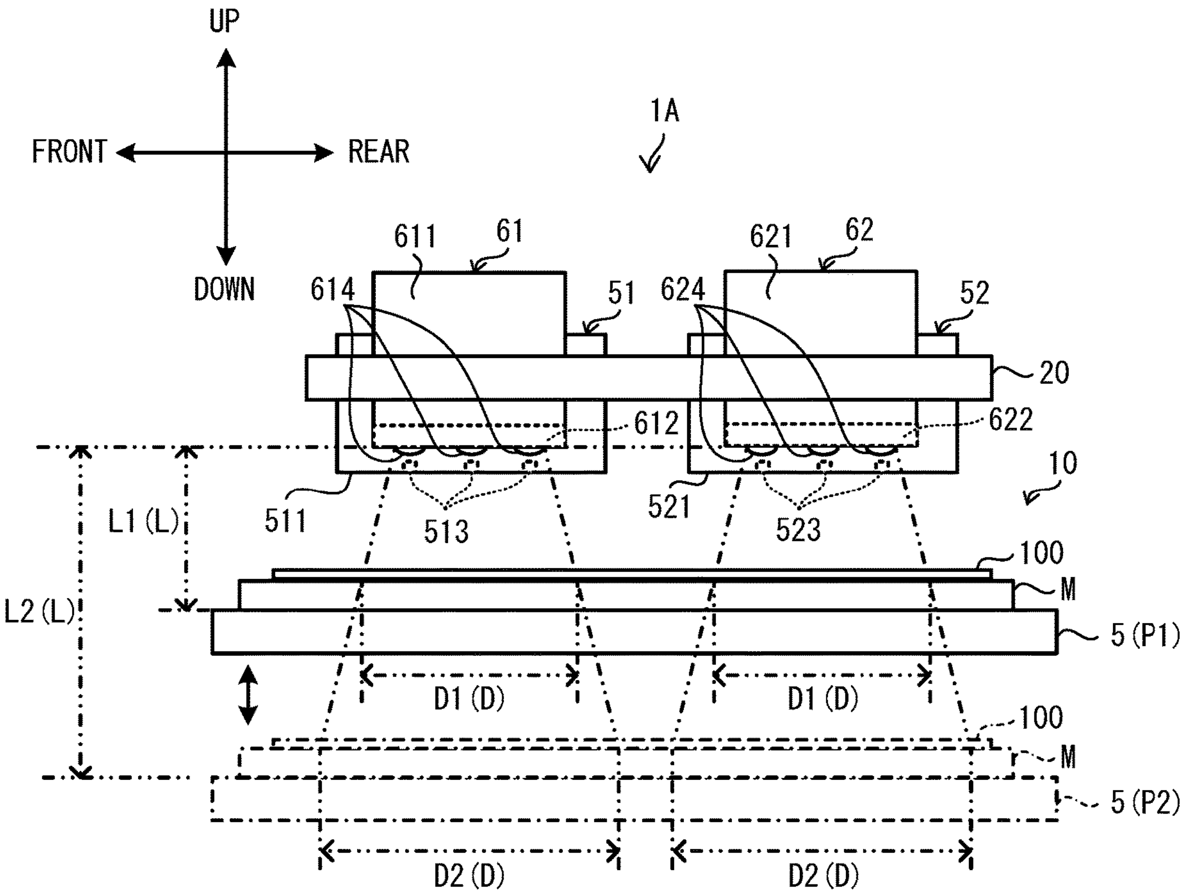
FIG. 2 is a schematic diagram of the printer as viewed from the right.

The printer 1A shown in FIG. 1 is an inkjet type UV printer, and performs printing in which ink is ejected onto an object to be printed M shown in FIG. 2, and ultraviolet light is irradiated onto the ejected ink. The object to be printed M is not limited to a particular medium, and has a plate shape or sheet shape, for example, and is configured by cloth, paper, plastic, metal, or ceramic, for example. The inks are ultraviolet curable, and are cured by being irradiated with the ultraviolet light.

The white ink is used to represent white color portions of an image, or as a base for the color inks. The color inks are ejected directly onto the object to be printed M, or onto the base formed by the white ink, and are used to print a color image. The clear ink has greater optical transparency than the white ink and the color inks. The clear ink is ejected onto the color image, and is used for protecting the color image.

A mechanical configuration of the printer 1A will be described with reference to FIG. 1 to FIG. 3. As shown in FIG. 1, the printer 1A is provided with a conveyance mechanism 6, a raising/lowering mechanism 8, a platen 5, a pair of rails 11, and a carriage 20. The conveyance mechanism 6 is provided on a lower portion of the printer 1A, and includes a pair of rails 12. The pair of rails 12 extend in the front-rear direction, and are aligned with each other in the left-right direction. Note that in the embodiment, "one member is aligned with another member in a specific direction" means that, as viewed from the specific direction, a part or all of the one member is disposed so as to overlap with a part or all of the other member (this also applies to the modified examples).

The raising/lowering mechanism 8 is provided on the upper side of the conveyance mechanism 6, and is supported by the pair of rails 12. The raising/lowering mechanism 8 moves in the front-rear direction along the pair of rails 12. The raising/lowering mechanism 8 is configured to expand and contract in the up-down direction.

The platen 5 is provided on the upper side of the raising/lowering mechanism 8. The platen 5 is a plate and extends in the front-rear direction and the left-right direction. The platen 5 has a rectangular shape in a plan view, and is supported by the raising/lowering mechanism 8. The object to be printed M shown in FIG. 2 is placed on the upper surface of the platen 5. The platen 5 is moved in the front-rear direction by the movement in the front-rear direction of the raising/lowering mechanism 8. The platen 5 is moved in the up-down direction by the expansion and contraction in the up-down direction of the raising/lowering mechanism 8.

The pair of rails 11 extend in the left-right direction and are aligned with each other in the front-rear direction. The carriage 20 is provided between the pair of rails 11 in the front-rear direction. The carriage 20 is a plate and extends in the front-rear direction and the left-right direction. The carriage 20 is supported by the pair of rails 11. The carriage 20 moves in the left-right direction along the pair of rails 11.

Figure 3:
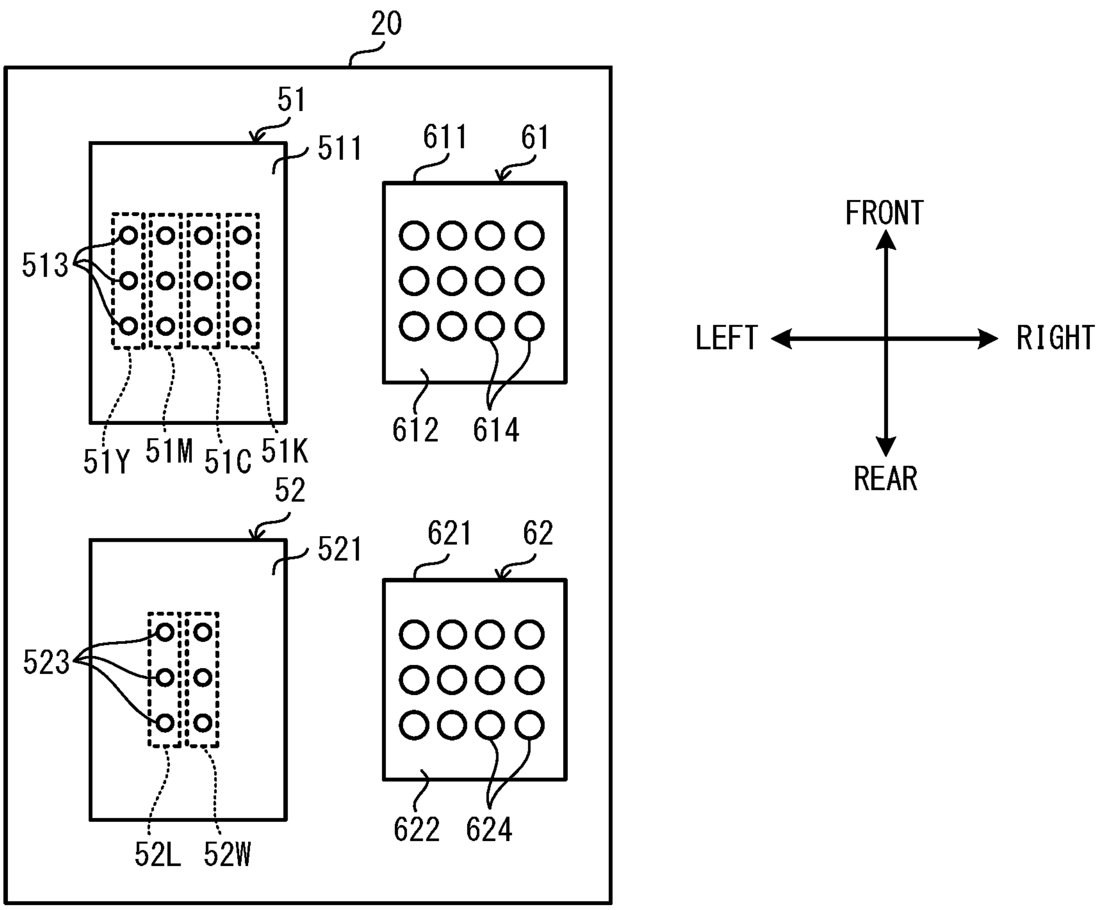
FIG. 3 is a schematic diagram of a carriage according to an embodiment, as viewed from below.

As shown in FIG. 1 to FIG. 3, a color head 51, a white/clear head 52, a color side lamp 61, and a white/clear side lamp 62 are installed on the carriage 20. The color head 51 and the white/clear head 52 have a cuboid shape, and are aligned with each other in the front-rear direction. The color head 51 is positioned at the front portion of the carriage 20. The white/clear head 52 is positioned to the rear of the color head 51.

The color side lamp 61 and the white/clear side lamp 62 have a cuboid shape and are aligned with each other in the front-rear direction. The color side lamp 61 is aligned to the right side of the color head 51. The white/clear side lamp 62 is aligned to the right side of the white/clear head 52. The color head 51, the white/clear head 52, the color side lamp 61, and the white/clear side lamp 62 are moved in the left-right direction by the movement in the left-right direction of the carriage 20.

As shown in FIG. 2 and FIG. 3, a nozzle surface 511 is formed at the lower surface of the color head 51. A nozzle surface 521 is formed at the lower surface of the white/clear head 52. The nozzle surfaces 511 and 521 are exposed downward from the carriage 20. As shown in FIG. 2, the nozzle surfaces 511 and 521 are positioned higher than the platen 5, and face the platen 5 in the up-down direction.

As shown in FIG. 3, nozzle rows 51Y, 51M, 51C, and 51K are formed in the nozzle surface 511. The nozzle rows 51Y, 51M, 51C, and 51K are aligned in the order of the nozzle rows 51Y, 51M, 51C, and 51K from the left toward the right. The nozzle rows 51Y, 51M, 51C, and 51K are respectively configured by a plurality of nozzles 513 being aligned in a single row in the front-rear direction. The plurality of nozzles 513 eject the inks downward. In the embodiment, the color head 51 ejects the yellow ink from the nozzle row 51Y, ejects the magenta ink from the nozzle row 51M, ejects the cyan ink from the nozzle row 51C, and ejects the black ink from the nozzle row 51K.

Nozzle rows 52L and 52W are formed in the nozzle surface 521. The nozzle row 52W is aligned to the right side of the nozzle row 52L. The nozzle rows 52L and 52W are respectively configured by a plurality of nozzles 523 being aligned in a single row in the front-rear direction. The plurality of nozzles 523 eject the inks downward. In the embodiment, the white/clear head 52 ejects the clear ink from the nozzle row 52L and ejects the white ink from the nozzle row 52W.

As shown in FIG. 2 and FIG. 3, the color side lamp 61 is provided with a housing 611, a substrate 612, and a plurality of ultraviolet light-emitting diodes 614. The housing 611 has a cuboid shape and is fixed to the carriage 20. The lower end of the housing 611 is exposed downward from the carriage 20. The substrate 612 is provided at the lower end of the housing 611. The substrate 612 has a rectangular shape when viewed from below, and extends in the front-rear direction and the left-right direction. As shown in FIG. 2, the substrate 612 is positioned higher than the platen 5 and faces the platen 5 in the up-down direction. As shown in FIG. 3, the plurality of ultraviolet light-emitting diodes 614 are provided in a lattice pattern at the lower surface of the substrate 612. The plurality of ultraviolet light-emitting diodes 614 emit ultraviolet light by being illuminated.

The white/clear side lamp 62 is provided with a housing 621, a substrate 622, and a plurality of ultraviolet light-emitting diodes 624. The housing 621 has a cuboid shape and is fixed to the carriage 20. The lower end of the housing 621 is exposed downward from the carriage 20. The substrate 622 is provided at the lower end of the housing 621. The substrate 622 has a rectangular shape when viewed from below, and extends in the front-rear direction and the left-right direction. As shown in FIG. 2, the substrate 622 is positioned higher than the platen 5 and faces the platen 5 in the up-down direction. As shown in FIG. 3, the plurality of ultraviolet light-emitting diodes 624 are provided in a lattice pattern at the lower surface of the substrate 622. The plurality of ultraviolet light-emitting diodes 624 emit ultraviolet light by being illuminated. The color side lamp 61 and the white/clear side lamp 62 irradiate the ultraviolet light downward by illuminating the ultraviolet light-emitting diodes 614 and 624, respectively. The substrates 612 and 622 are positioned such that the respective lower surfaces thereof are at the same position as each other in the up-down direction.

As shown in FIG. 2, in the embodiment, a distance in the up-down direction between the upper surface of the platen 5 and the plurality of ultraviolet light-emitting diodes 614 and 624 will be referred to as an "irradiation distance L." The platen 5 moves in the up-down direction between a raised position P1 and a lowered position P2. The raised position P1 is a position of the platen 5 in the up-down direction at which the irradiation distance L is a first distance L1. The lowered position P2 is a position of the platen 5 in the up-down direction at which the irradiation distance L is a second distance L2. The second distance L2 is greater than the first distance L1.

A region of the object to be printed M that is irradiated by the ultraviolet light by the color side lamp 61 will be referred to as an "irradiation region D." Both ends, in the front-rear direction, of the irradiation region D are boundaries between a region onto which the ultraviolet light is irradiated and a region onto which the ultraviolet light is not irradiated. An irradiation region D1 is the irradiation region D when the platen 5 is positioned at the raised position P1. An irradiation region D2 is the irradiation region D when the platen 5 is positioned at the lowered position P2. The greater the irradiation distance L, the larger a width, in the front-rear direction, of the irradiation region D. The first distance L1 is larger than the second distance L2, and thus, in the front-rear direction, the width of the irradiation region D2 is larger than the width of the irradiation region D1.

A printing operation by the printer 1A will be described with reference to FIG. 1 to FIG. 3. A region at which a movement path in the left-right direction of the carriage 20 overlaps, in the up-down direction, with a movement path in the front-rear direction of the platen 5 will be referred to as a "printing region 10" (refer to FIG. 1 and FIG. 2). The printing operation is performed in a state in which the platen 5 and the carriage 20 are positioned at the printing region 10. In the printing operation, a reciprocating movement of the carriage 20 in the left-right direction, and the forward or rearward movement of the platen 5 by a predetermined amount are repeated.

When the carriage 20 is moving from the right to the left, one or both of the color head 51 and the white/clear head 52 eject the inks onto the object to be printed M (refer to FIG. 2) on the platen 5. In this way, the ink lands on the object to be printed M. Hereinafter, the layer of ink that is formed by the ink that has landed on the object to be printed M will simply be referred to as an "ink layer 100" (refer to FIG. 2).

Furthermore, when the carriage 20 is moving from the right to the left, one or both of the color side lamp 61 and the white/clear side lamp 62 irradiate the ultraviolet light onto the object to be printed M (refer to FIG. 2) on the platen 5. The color side lamp 61 and the white/clear side lamp 62 are respectively positioned, with respect to the color head 51 and the white/clear head 52, on the opposite side (on the right side) to the progress direction of the carriage 20. Thus, when the carriage 20 moves from the right to the left, the ultraviolet light irradiated onto the object to be printed M is irradiated onto the ink layer 100 (refer to FIG. 2) formed on the object to be printed M in the current movement of the carriage 20 from the right to the left. In this way, the ink layer 100 is cured.

When the carriage 20 is moving from the left to the right, both the color head 51 and the white/clear head 52 stop the ejection of the inks onto the object to be printed M on the platen 5. When the carriage 20 is moving from the left to the right, one or both of the color side lamp 61 and the white/clear side lamp 62 irradiate the ultraviolet light onto the object to be printed M on the platen 5.

When the carriage 20 moves from the left to the right, the ultraviolet light irradiated onto the object to be printed M is irradiated onto the ink layer 100 (refer to FIG. 2) formed on the object to be printed M in the movement of the carriage 20 from the right to the left in a predetermined number of times previous to a current scan. In this way, an integrated amount of the ultraviolet light irradiated onto the ink layer 100 increases. Hereinafter, the integrated amount per unit area of the ultraviolet light irradiated onto the ink layer 100 shown in FIG. 2 will simply be referred to as the "integrated amount."

The electrical configuration of the printer 1A will be described with reference to FIG. 4. The printer 1A is provided with a control board 40. A CPU 41, a ROM 42, a RAM 43, and a flash memory 44 are provided at the control board 40. The CPU 41 controls the printer 1A, and is electrically connected to the ROM 42, the RAM 43, and the flash memory 44.

The ROM 42 stores a control program used by the CPU 41 to control the operations of the printer 1A, information necessary for the CPU 41 when executing various programs, and the like. The ROM 42 stores, in association with each other, rotation angles of each of a main scanning motor 31, a sub-scanning motor 32, and a raising/lowering motor 34 to be described later, a position of the carriage 20 in the left-right direction, a position of the platen 5 in the front-rear direction, and a position of the platen 5 in the up-down direction, respectively. The RAM 43 temporarily stores various data and the like used by the control program. The flash memory 44 is non-volatile, and stores print data and the like for performing the printing. The flash memory 44 stores the first distance L1 and the second distance L2 shown in FIG. 2, for example.

The CPU 41 is electrically connected to the main scanning motor 31, the sub-scanning motor 32, the raising/lowering motor 34, a head drive portion 33, the plurality of ultraviolet light-emitting diodes 614, the plurality of ultraviolet light-emitting diodes 624, and an operation portion 37. The main scanning motor 31, the sub-scanning motor 32, the raising/lowering motor 34, the head drive portion 33, the plurality of ultraviolet light-emitting diodes 614, and the plurality of ultraviolet light-emitting diodes 624 are respectively driven under control of the CPU 41.

The driving of the main scanning motor 31 causes the carriage 20 shown in FIG. 1 to move in the left-right direction. The driving of the sub-scanning motor 32 causes the raising/lowering mechanism 8 shown in FIG. 1 to move in the front-rear direction. The driving of the raising/lowering motor 34 causes the raising/lowering mechanism 8 shown in FIG. 1 to expand and contract in the up-down direction.

The main scanning motor 31, the sub-scanning motor 32, and the raising/lowering motor 34 are respectively provided with encoders 311, 321, and 341. The encoders 311, 321, and 341 respectively detect the rotation angle of the main scanning motor 31, the sub-scanning motor 32, and the raising/lowering motor 34, and output a detection signal to the CPU 41.

On the basis of the detection signal from the encoder 311, the CPU 41 can identify the position of the carriage 20 in the left-right direction. On the basis of the detection signal from the encoder 321, the CPU 41 can identify the position of the platen 5 shown in FIG. 1 in the front-rear direction. On the basis of the detection signal from the encoder 341, the CPU 41 can identify the position of the platen 5 shown in FIG. 1 in the up-down direction.

The head drive portion 33 is configured by piezoelectric elements or heating elements, and, when driven, causes the color head 51 or the white/clear head 52 shown in FIG. 1 to eject the ink. The operation portion 37 is a touch panel or the like, and outputs information to the CPU 41 in accordance with an operation by a user. As a result of the user operating the operation portion 37, a print command for starting the printing by the printer 1A or the like can be input to the printer 1A. By the user operating the operation portion 37, a print mode, which is one of a normal print mode and a gloss print mode, can be set on the printer 1A.

The normal print mode specifies a print method for creating a printed object without smoothing the ink layer 100 shown in FIG. 2, or by suppressing the smoothing of the ink layer 100. When the printing operation is performed in a state in which the normal print mode is set, the printer 1A can create a matte finish printed object 100A (refer to FIG. 5) to be described later.

The gloss print mode specifies a print method for creating the printed object while smoothing the ink layer 100 shown in FIG. 2 to a greater extent than in the normal print mode. When the printing operation is performed in a state in which the gloss print mode is set, the printer 1A can create a gloss finish printed object 100B (refer to FIG. 6) to be described later.

Figure 5:
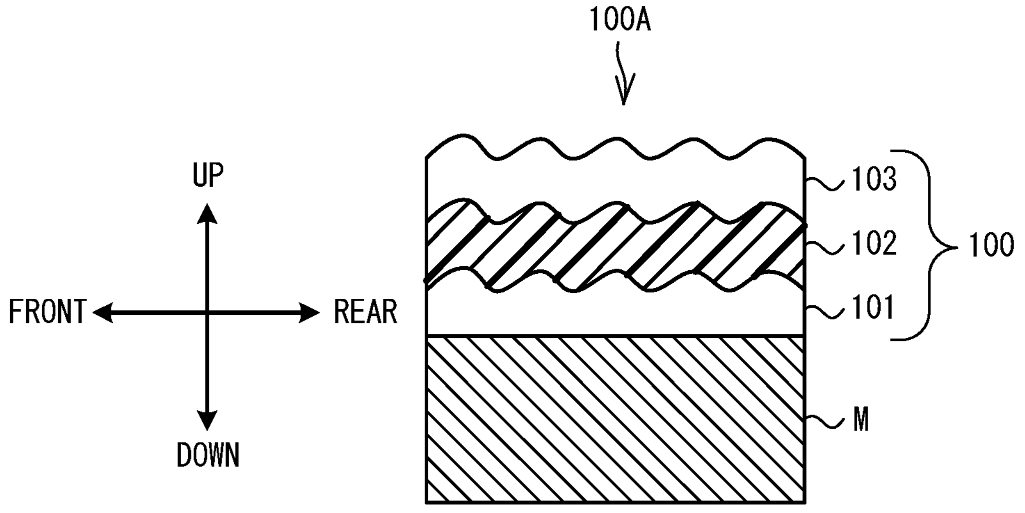
FIG. 5 is a schematic diagram showing a cross section of a matte finish printed object.
Figure 6:
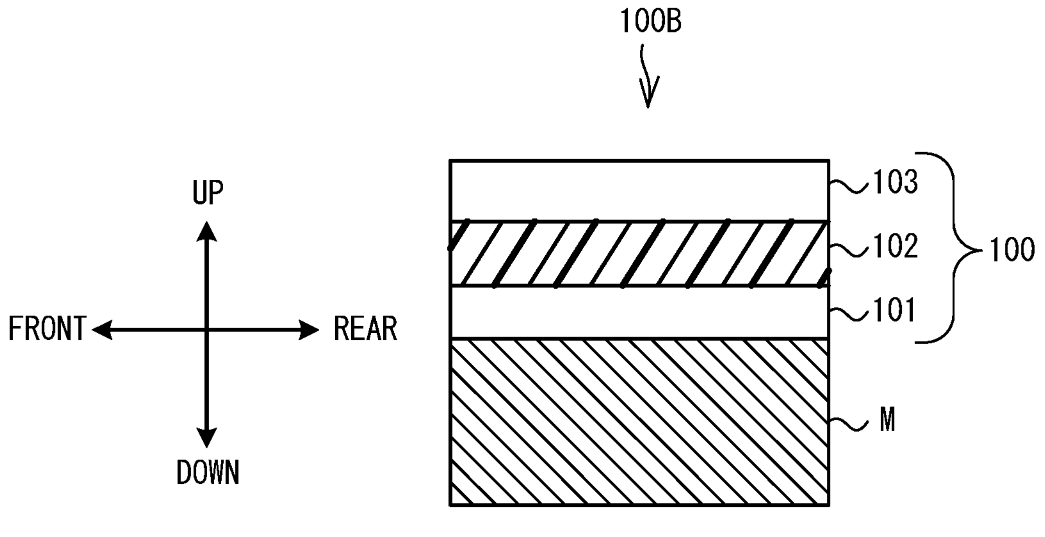
FIG. 6 is a schematic diagram showing a cross section of a gloss finish printed object.

The matte finish printed object 100A, and the gloss finish printed object 100B will be described with reference to FIG. 2, FIG. 5, and FIG. 6. FIG. 5 and FIG. 6 show an example in which, as the ink layer 100, a white ink layer 101, a color ink layer 102, and a clear ink layer 103 are formed from the upper surface of the object to be printed M upward, in order of the white ink layer 101, the color ink layer 102, and the clear ink layer 103. In other words, in the matte finish printed object 100A shown in FIG. 5 and the gloss finish printed object 100B shown in FIG. 6, the clear ink layer 103 is the uppermost surface layer.

The matte finish printed object 100A shown in FIG. 5 is created by the ink layer 100 being cured in a state in which the smoothing of the ink layer 100 is relatively unadvanced. Thus, the matte finish printed object 100A does not have a glossy finish or has a comparatively low glossy finish. The gloss finish printed object 100B shown in FIG. 6 is created by the ink layer 100 being cured in a state in which the smoothing of the ink layer 100 is more advanced than for the matte finish printed object 100A shown in FIG. 5. Thus, the gloss finish printed object 100B has a glossier finish than the matte finish printed object 100A.

Hereinafter, an illuminance of the ultraviolet light generated by the color side lamp 61 or the white/clear side lamp 62 will simply be referred to as "illuminance." In the ink layer 100, a difference between the illuminance at a center portion in the front-rear direction of the irradiation region D shown in FIG. 2, and the illuminance at both end portions in the front-rear direction of the irradiation region D will be referred to as an "illuminance difference".

When, as shown in FIG. 2, the illuminance difference is large, in the front-rear direction, a curing speed of the ink layer 100 at the center portion of the irradiation region D is faster compared to the curing speed of the ink layer 100 at both the end portions of the irradiation region D. In this case, in particular, the ink layer 100 in the gloss finish printed object 100B shown in FIG. 6 is smoothed, and thus, as a result of a shrinkage effect caused by the curing of the ink layer 100, there is a possibility that a striped pattern may occur at both the end portions in the front-rear direction of the irradiation region D of the ink layer 100. Thus, when creating the gloss finish printed object 100B shown in FIG. 6, it is necessary for the printer 1A to reduce the illuminance difference in order to suppress the occurrence of the striped pattern in the ink layer 100.

The illuminance difference changes depending on the irradiation distance L and the like. For example, the larger the irradiation distance L, the larger the width in the front-rear direction of the irradiation region D becomes, and thus, the more gradual the reduction in the illuminance from the center portion in the front-rear direction of the irradiation region D toward both the ends in the front-rear direction of the irradiation region D. As a result, the illuminance difference is smaller when the platen 5 is positioned at the lowered position P2 than when the platen 5 is positioned at the raised position P1. Thus, in the front-rear direction, the difference between the curing speed of the ink layer 100 at both the end portions of the irradiation region D and the curing speed of the ink layer 100 at the center portion of the irradiation region D becomes smaller when the platen 5 is positioned at the lowered position P2 compared to when the platen 5 is positioned at the raised position P1. As a result, in the ink layer 100, the striped pattern is less likely to occur at both the end portions in the front-rear direction of the irradiation region D when the platen 5 is at the lowered position P2 than when the platen 5 is at the raised position P1.

On the other hand, the ultraviolet light irradiated by the ultraviolet light-emitting diodes 614 and 624 is reflected by the ink layer 100 or the object to be printed M. Thus, when the matte finish printed object 100A shown in FIG. 5 is created, for example, when the irradiation distance L shown in FIG. 2 is great, a possibility of the reflected ultraviolet light being irradiated onto the nozzle surfaces 511 and 521 increases. If the ultraviolet light is irradiated onto the nozzle surfaces 511 and 521, there is a possibility that the ink inside the nozzles 513 and 523 may be cured and an ink discharge failure may occur.

The irradiation distance L is smaller when the platen 5 is positioned at the raised position P1 than when the platen 5 is positioned at the lowered position P2. Thus, the possibility of the ink discharge failure occurring is lower when the platen 50 is positioned at the raised position P1 than when the platen 5 is positioned at the lowered position P2.

In main processing to be described below, in the gloss print mode, the printer 1A creates the gloss finish printed object 100B while suppressing the occurrence of the striped pattern in the ink layer 100 by positioning the platen 5 at the lowered position P2. In the normal print mode, the printer 1A creates the matte finish printed object 100A while suppressing the occurrence of the ink discharge failure by positioning the platen 5 at the raised position P1.

The main processing will be described with reference to FIG. 7 to FIG. 13. The user places the object to be printed M on the platen 5 shown in FIG. 2. The user operates the operation portion 37 shown in FIG. 4, and inputs the print command to the printer 1A. When the print command is input, the CPU 41 performs the main processing shown in FIG. 7 by reading out and executing the control program from the ROM 42.

Figure 7:
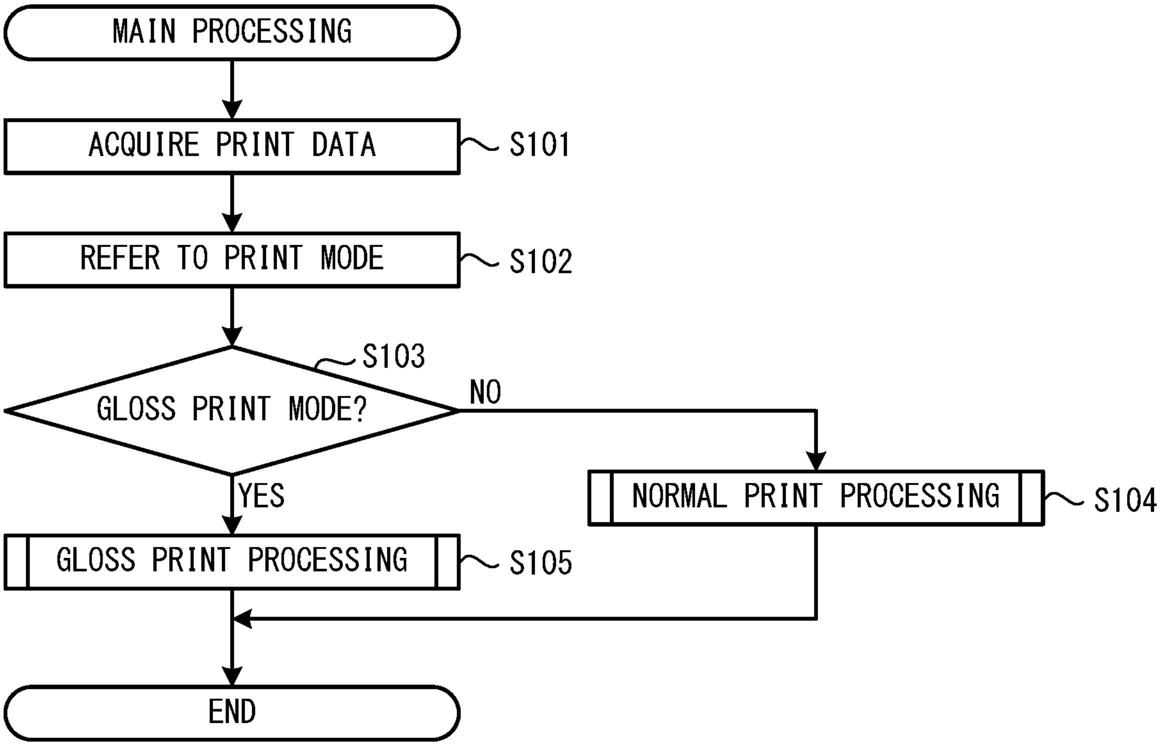
FIG. 7 is a flowchart of main processing.

Hereinafter, the description will be given using cases in which the matte finish printed object 100A shown in FIG. 5 or the gloss finish printed object 100B shown in FIG. 6 are created as examples. When the main processing shown in FIG. 7 is started, it is assumed that the platen 5 is positioned at a set position shown in FIG. 1, and the carriage 20 is positioned at a stand-by position shown in FIG. 1. The set position is at the front end of a movement range, in the front-rear direction, of the platen 5, and is a position of the platen 5 when the object to be printed M is set on the platen 5. The stand-by position is a left end of a movement range, in the left-right direction, of the carriage 20.

When, in main scanning processing to be described below, a setting is made to eject the ink, this will be referred to as "setting the ink to ON," and when a setting is made to stop the ejection of the ink, this will be referred to as "setting the ink to OFF." Note that the setting to eject in the ink in the main scanning processing means, during the execution of the main scanning processing, setting a state in which the ink can be ejected such that the ink lands at predetermined positions on the object to be printed M in accordance with the print data.

When, in the main scanning processing to be described below, a setting is made to illuminate the ultraviolet light-emitting diodes 614, this will be referred to as "switching the color right-side lamp 61 ON," and when a setting is made to extinguish the ultraviolet light-emitting diodes 614, this will be referred to as "switching the color right-side lamp 61 OFF." When, in the main scanning processing, a setting is made to illuminate the ultraviolet light-emitting diodes 624, this will be referred to as "switching the white/clear right-side lamp 62 ON," and when a setting is made to extinguish the ultraviolet light-emitting diodes 624, this will be referred to as "switching the white/clear right-side lamp 62 OFF." Note that the setting to perform the illumination in the main scanning processing refers to all the ultraviolet light-emitting diodes 614 and 624 being constantly illuminated during the execution of the main scanning processing.

As shown in FIG. 7, when the main processing is started, the CPU 41 acquires, from the flash memory 44, the print data specified by the print command, and stores the acquired print data in the RAM 43 (step S101). The CPU 41 refers to the print mode setting in the flash memory 44 (step S102).

On the basis of a referred result, the CPU 41 determines whether the set print mode is the gloss print mode (step S103). When the set print mode is the normal print mode (no at step S103), the CPU 41 performs normal print processing shown in FIG. 8 (step S104). In the normal print processing, the matte finish printed object 100A shown in FIG. 5 is created. The CPU 41 ends the main processing.

Figure 9:
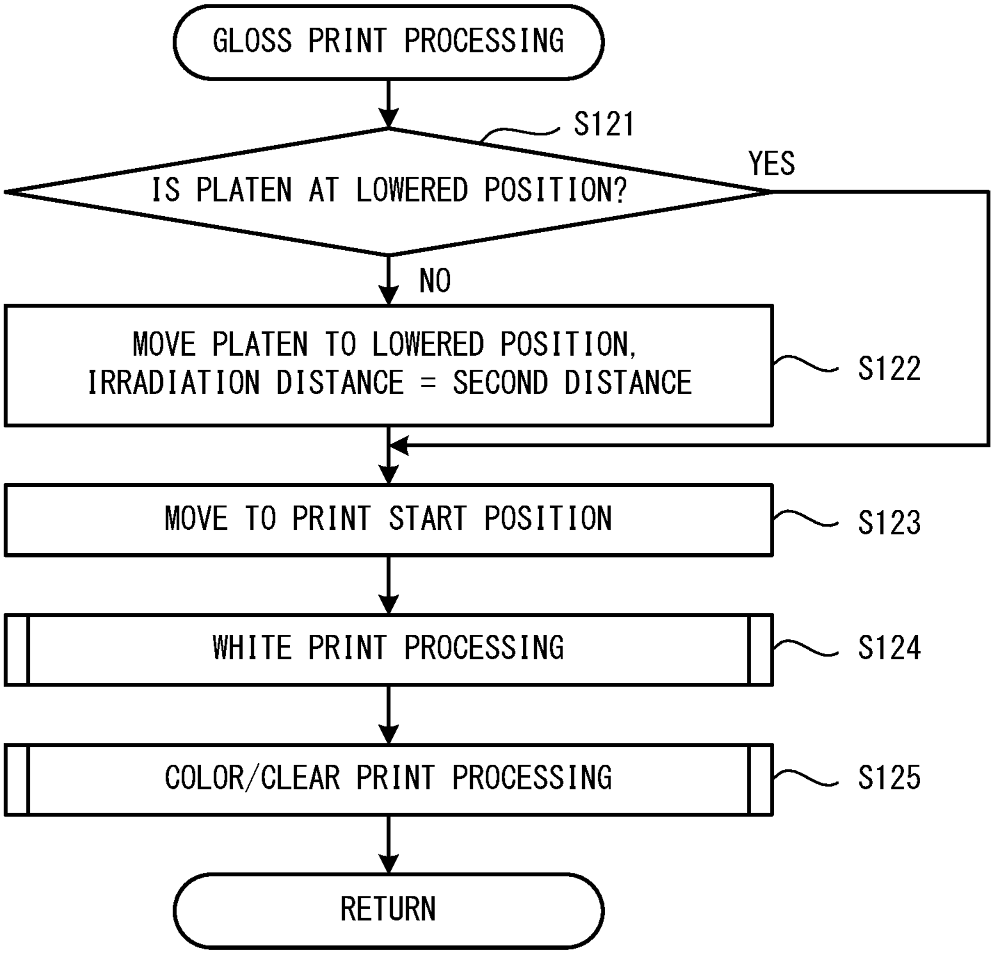
FIG. 9 is a flowchart of gloss print processing.

When the set print mode is the gloss print mode (yes at step S103), the CPU 41 performs gloss print processing shown in FIG. 9 (step S105). In the gloss print processing, the gloss finish printed object 100B shown in FIG. 6 is created. The CPU 41 ends the main processing.

The normal print processing (step S104) will be described with reference to FIG. 8. When the normal print processing is started, on the basis of a detection result from the encoder 341 shown in FIG. 4, the CPU 41 determines whether the platen 5 is positioned at the raised position P1 shown in FIG. 2 (step S111). When the platen 5 is positioned at the raised position P1 shown in FIG. 2 (yes at step S111), the CPU 41 shifts the processing to step S113.

Figure 4:
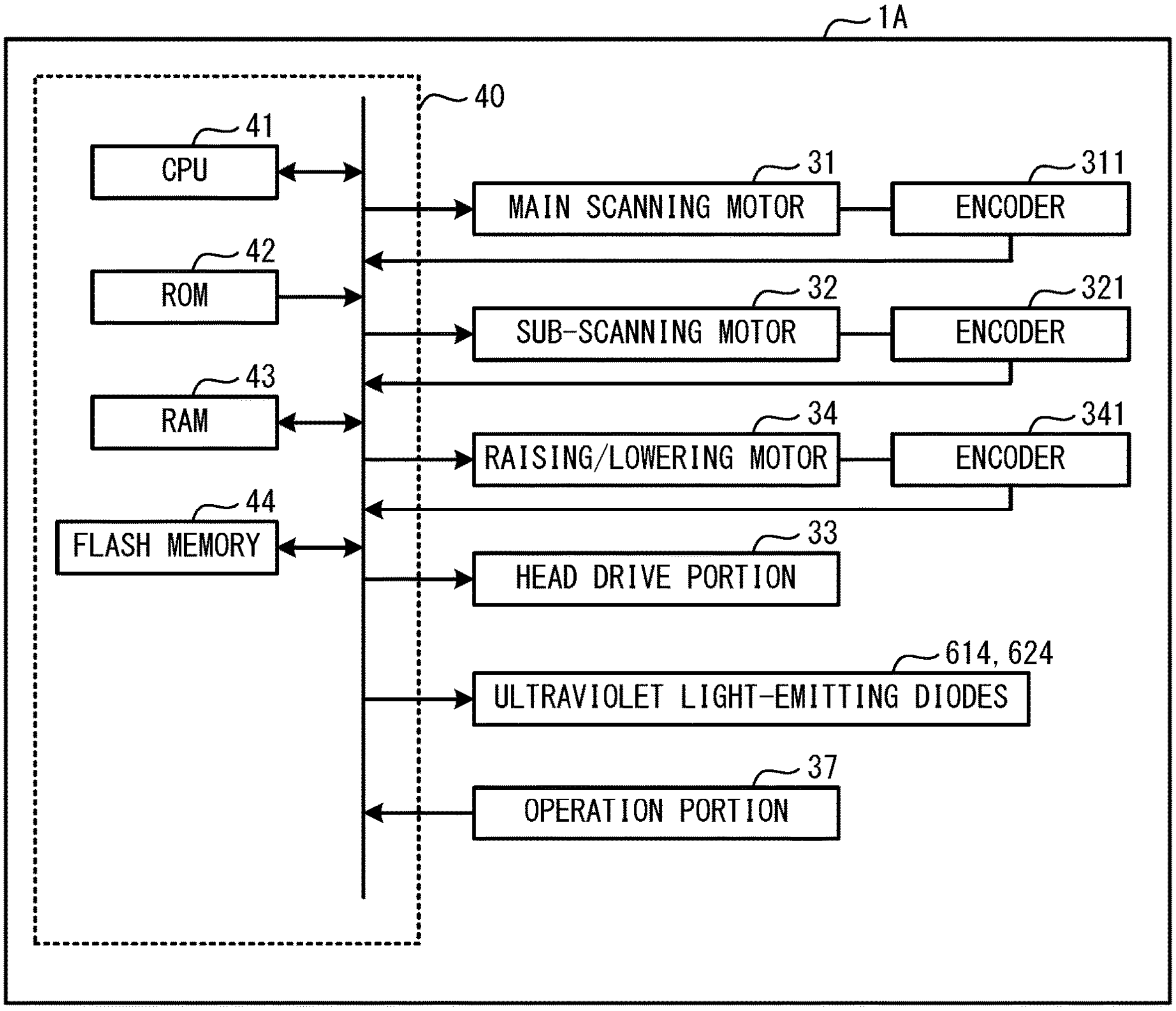
FIG. 4 is a block diagram showing an electrical configuration of the printer.

When the platen 5 is not positioned at the raised position P1 shown in FIG. 2 (no at step S111), the CPU 41 controls the raising/lowering motor 34 on the basis of the detection result from the encoder 341 shown in FIG. 4, and moves the platen 5 to the raised position P1 shown in FIG. 2 (step S112). In this way, the irradiation distance L becomes the first distance L1 shown in FIG. 2. The CPU 41 shifts the processing to step S113.

The CPU 41 controls the sub-scanning motor 32 on the basis of the detection result from the encoder 321 shown in FIG. 4, and moves the platen 5 shown in FIG. 2 to the rear from the set position shown in FIG. 1 to a platen print start position (not shown in the drawings) (step S113). The platen print start position is a position of the platen 5 when a front end of a region (not shown in the drawings) on which an image is to be printed, of the object to be printed M shown in FIG. 2, is positioned further to the rear than the white/clear head 52 shown in FIG. 2. The CPU 41 controls the main scanning motor 31 on the basis of the detection result from the encoder 311 shown in FIG. 4, and moves the carriage 20 shown in FIG. 1 to the right from the stand-by position, to a carriage print start position (step S113). The carriage print start position is a position of the carriage 20 when the color head 51 and the white/clear head 52 shown in FIG. 2 are positioned further to the right than a right end of the region (not shown in the drawings) on which the image is to be printed, of the object to be printed M shown in FIG. 2.

The CPU 41 performs white print processing (step S114). In the white print processing at step S114, while the platen 5 moves forward from the platen print start position, the white ink layer 101 shown in FIG. 5 is formed on the object to be printed M. The CPU 41 performs color/clear print processing (step S115). In the color/clear print processing at step S115, while the platen 5 moves rearward, the color ink layer 102 shown in FIG. 5 is formed on the white ink layer 101, and the clear ink layer 103 shown in FIG. 5 is formed on the color ink layer 102, on the object to be printed M. The CPU 41 returns the processing to the main processing shown in FIG. 7.

The gloss print processing (step S105) will be described with reference to FIG. 9. When the gloss print processing is started, on the basis of the detection result from the encoder 341 shown in FIG. 4, the CPU 41 determines whether the platen 5 is positioned at the lowered position P2 shown in FIG. 2 (step S121). When the platen 5 is positioned at the lowered position P2 shown in FIG. 2 (yes at step S121), the CPU 41 shifts the processing to step S123.

When the platen 5 is not positioned at the lowered position P2 shown in FIG. 2 (no at step S121), the CPU 41 controls the raising/lowering motor 34 on the basis of the detection result from the encoder 341 shown in FIG. 4, and moves the platen 5 to the lowered position P2 shown in FIG. 2 (step S122). In this way, the irradiation distance L becomes the second distance L2 shown in FIG. 2. The CPU 41 shifts the processing to step S123.

The CPU 41 controls the sub-scanning motor 32 on the basis of the detection result from the encoder 321 shown in FIG. 4, and moves the platen 5 shown in FIG. 2 to the rear from the set position shown in FIG. 1 to the platen print start position (not shown in the drawings) (step S123). As described above, when the platen 5 is positioned at the platen print start position, the front end of the region (not shown in the drawings) on which the image is to be printed, of the object to be printed M shown in FIG. 2, is positioned further to the rear than the white/clear head 52 shown in FIG. 2. The CPU 41 controls the main scanning motor 31 on the basis of the detection result from the encoder 311 shown in FIG. 4, and moves the carriage 20 shown in FIG. 1 to the right from the stand-by position, to the carriage print start position (not shown in the drawings) (step S123). As described above, when the carriage 20 is positioned at the carriage print start position, the color head 51 and the white/clear head 52 shown in FIG. 2 are positioned further to the right than the right end of the region (not shown in the drawings) on which the image is to be printed, of the object to be printed M.

The CPU 41 performs the white print processing (step S124). In the white print processing at step S114, while the platen 5 moves forward from the platen print start position, the white ink layer 101 shown in FIG. 6 is formed on the object to be printed M. The CPU 41 performs the color/clear print processing (step S125). In the color/clear print processing at step S125, while the platen 5 moves rearward, the color ink layer 102 shown in FIG. 6 is formed on the white ink layer 101, and the clear ink layer 103 shown in FIG. 6 is formed on the color ink layer 102, on the object to be printed M. The CPU 41 returns the processing to the main processing shown in FIG. 7.

The white print processing (step S114 or step S124) will be described with reference to FIG. 10. In the white print processing at step S114 shown in FIG. 8 and in the white print processing at step S124 shown in FIG. 9, the position in the up-down direction of the platen 5 shown in FIG. 2 is different, and the content of each of the processing is the same. In the normal print mode, the CPU 41 performs the white print processing at step S114 shown in FIG. 8 with the platen 5 positioned at the raised position P1 shown in FIG. 2. In the gloss print mode, the CPU 41 performs the white print processing at step S124 shown in FIG. 9 with the platen 5 at the lowered position P2 shown in FIG. 2.

When the white print processing is started, the CPU 41 sets "left" as the main scanning direction (step S141). The CPU 41 sets the white ink to "ON" (step S142). The CPU 41 sets the color ink to "OFF" (step S143). The CPU 41 sets the clear ink to "OFF" (step S144). The CPU 41 sets the white/clear side lamp 62 to "ON" (step S145). The CPU 41 sets the color side lamp 61 to "OFF" (step S146).

The CPU 41 performs the main scanning processing on the basis of the settings at step S141 to step S146 (step S147). In the main scanning processing, movement control, ejection control, and irradiation control are performed. In the main scanning processing at step S147, in the movement control, the CPU 41 drives the main scanning motor 31 on the basis of the detection result from the encoder 311 shown in FIG. 4, and moves the carriage 20 shown in FIG. 1 to the left from the right end of the printing region 10 to the left end of the printing region 10. While executing the movement control, in the ejection control, the CPU 41 drives the head drive portion 33 shown in FIG. 4 on the basis of the print data, and causes the white/clear head 52 shown in FIG. 3 to eject the white ink from the nozzle row 52W. While executing the movement control, in the ejection control, the CPU 41 causes the white/clear head 52 shown in FIG. 3 to stop the ejection of the clear ink from the nozzle row 52L. While executing the movement control, in the ejection control, the CPU 41 causes the color head 51 shown in FIG. 3 to stop the ejection of the color inks from the nozzle rows 51Y, 51M, 51C, and 51K. While executing the movement control, in the irradiation control, the CPU 41 causes the plurality of ultraviolet light-emitting diodes 624 shown in FIG. 2 to be illuminated, and irradiates the ultraviolet light toward the object to be printed M from the white/clear side lamp 62. The ultraviolet light from the white/clear side lamp 62 is irradiated onto the white ink layer 101 shown in FIG. 5 and FIG. 6. While executing the movement control, in the irradiation control, the CPU 41 causes the plurality of ultraviolet light-emitting diodes 614 shown in FIG. 2 to be extinguished, and stops the irradiation of the ultraviolet light onto the object to be printed M from the color side lamp 61.

The CPU 41 sets "right" as the main scanning direction (step S151). The CPU 41 sets the white ink to "OFF" (step S152). The CPU 41 sets the color ink to "OFF" (step S153). The CPU 41 sets the clear ink to "OFF" (step S154). The CPU 41 sets the white/clear side lamp 62 to "ON" (step S155). The CPU 41 sets the color side lamp 61 to "OFF" (step S156).

The CPU 41 performs the main scanning processing on the basis of the settings at step S151 to step S156 (step S157). In the main scanning processing at step S157, in the movement control, the CPU 41 drives the main scanning motor 31 on the basis of the detection result from the encoder 311 shown in FIG. 4, and moves the carriage 20 shown in FIG. 1 to the right from the left end of the printing region 10 to the right end of the printing region 10. While executing the movement control, in the ejection control, the CPU 41 causes the white/clear head 52 shown in FIG. 3 to stop the ejection of the white ink from the nozzle row 52W. While executing the movement control, in the ejection control, the CPU 41 causes the white/clear head 52 shown in FIG. 3 to stop the ejection of the clear ink from the nozzle row 52L. While executing the movement control, in the ejection control, the CPU 41 causes the color head 51 shown in FIG. 3 to stop the ejection of the color inks from the nozzle rows 51Y, 51M, 51C, and 51K. While executing the movement control, in the irradiation control, the CPU 41 causes the plurality of ultraviolet light-emitting diodes 624 shown in FIG. 2 to be illuminated, and irradiates the ultraviolet light toward the object to be printed M from the white/clear side lamp 62. The ultraviolet light from the white/clear side lamp 62 is irradiated onto the white ink layer 101 shown in FIG. 5 and FIG. 6. While executing the movement control, in the irradiation control, the CPU 41 causes the plurality of ultraviolet light-emitting diodes 614 shown in FIG. 2 to be extinguished, and stops the irradiation of the ultraviolet light onto the object to be printed M from the color side lamp 61.

On the basis of the print data, the CPU 41 determines whether, of the object to be printed M shown in FIG. 5 and FIG. 6, the formation of the white ink layer 101 is complete on all of the region on which the image is to be printed (step S158). When, of the object to be printed M shown in FIG. 5 and FIG. 6, the formation of the white ink layer 101 is not complete on the region on which the image is to be printed (no at step S158), the CPU 41 sets "forward" as a sub-scanning direction (step S161). The CPU 41 performs sub-scanning processing on the basis of the setting at step S161 (step S162). In the sub-scanning processing at step S162, the CPU 41 controls the sub-scanning motor 32 on the basis of the detection result from the encoder 321 shown in FIG. 4, and moves the platen 5 shown in FIG. 2 forward. When the platen 5 shown in FIG. 2 moves forward by a predetermined movement amount, the CPU 41 stops the sub-scanning motor 32 shown in FIG. 4. The CPU 41 shifts the processing to step S141.

The CPU 41 repeats the main scanning processing (step S147 and step S157) and the sub-scanning processing (step S162) until, of the object to be printed M shown in FIG. 5 and FIG. 6, the formation of the white ink layer 101 is complete on all the region on which the image is to be printed. When, of the object to be printed M shown in FIG. 5 and FIG. 6, the formation of the white ink layer 101 is complete on all of the region on which the image is to be printed (yes at step S158), the CPU 41 returns the processing to the normal print processing shown in FIG. 8 or the gloss print processing shown in FIG. 9.

A formation mode of the white ink layer 101 in the white print processing (step S114 or step S124) will be described with reference to FIG. 11. Below, "N" and "K" are natural numbers. FIG. 11 shows the white ink layer 101 using oblique solid lines. FIG. 11 shows a positional relationship in the front-rear direction between the carriage 20 and the object to be printed M when the N-th main scanning processing at step S157 shown in FIG. 10 has been completed.

Figure 10:
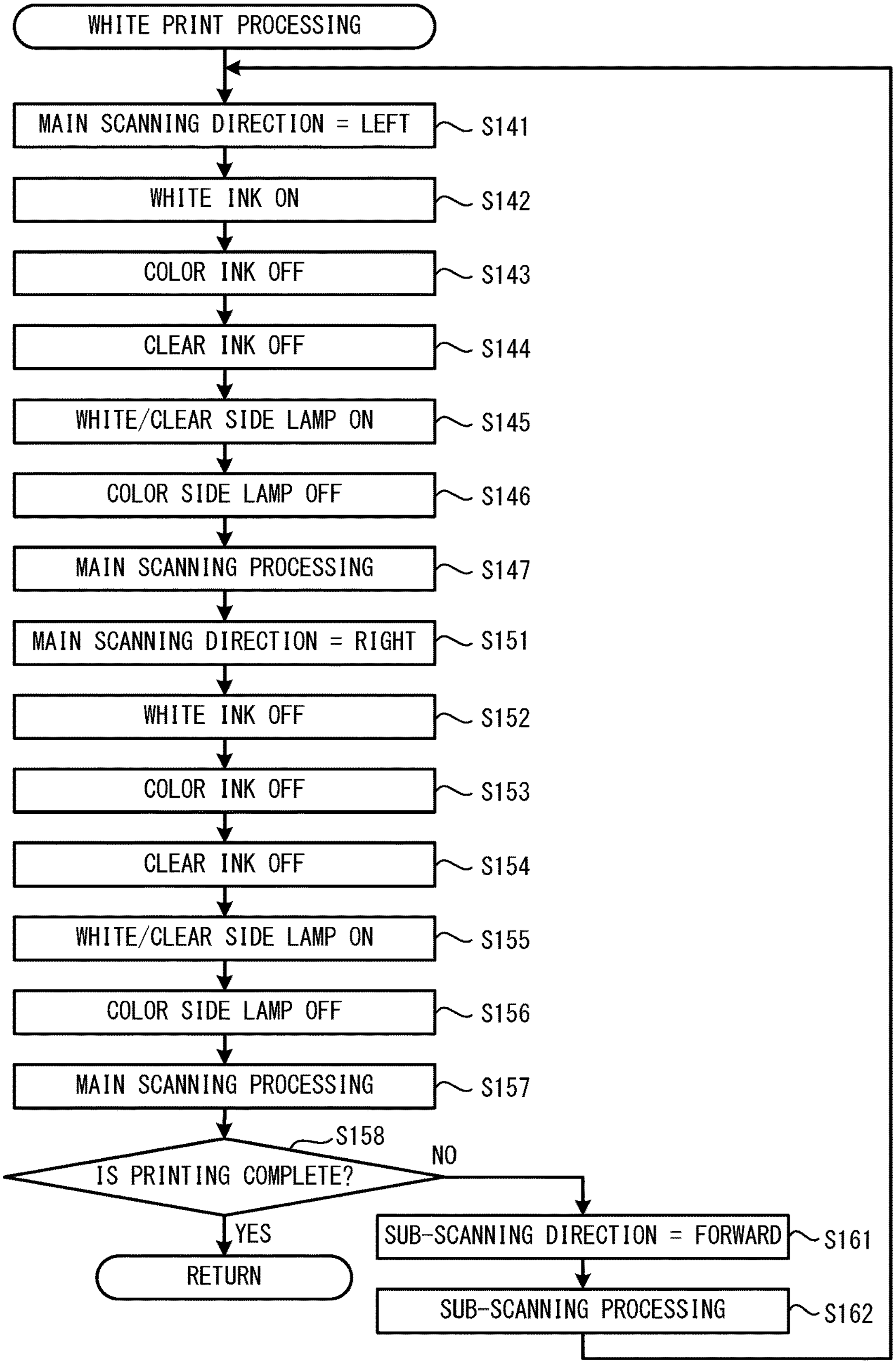
FIG. 10 is a flowchart of white print processing.
Figure 11:
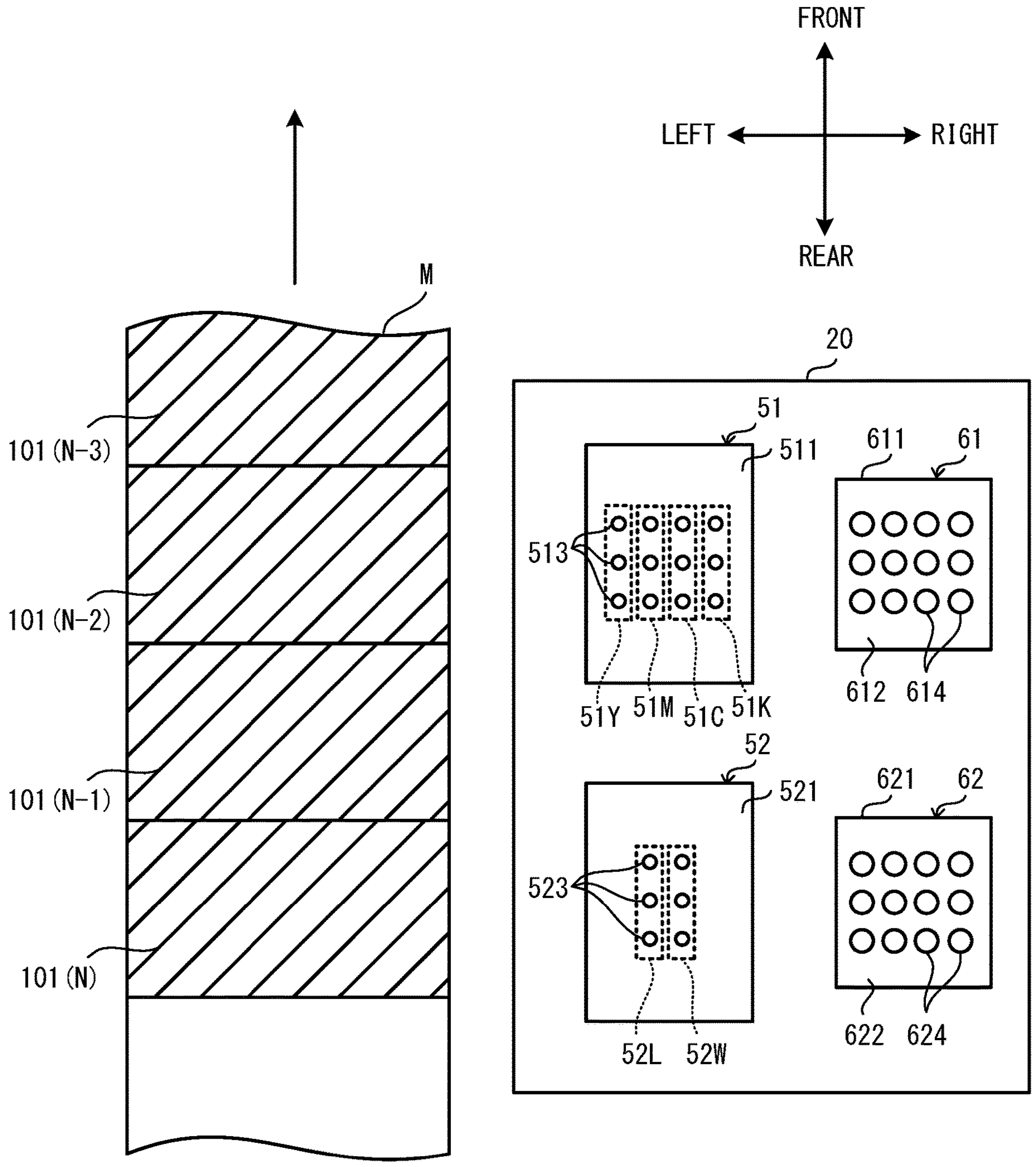
FIG. 11 is a diagram illustrating a formation mode of a white ink layer by the white print processing.

In the N-th main scanning processing at step S147 shown in FIG. 10, a white ink layer 101 (N) is formed on the object to be printed M by the ejection of the white ink from the white/clear head 52. In the main scanning processing at step S147 shown in FIG. 10, the carriage 20 moves from the right to the left, and the white/clear side lamp 62 is positioned further to the right than the white/clear head 52, that is, on the opposite side to the movement direction of the carriage 20. Thus, the ultraviolet light generated from the white/clear side lamp 62 during the N-th main scanning processing at step S147 shown in FIG. 10 is irradiated onto the white ink layer 101 (N). In this way, the curing of the white ink layer 101 (N) is promoted.

The ultraviolet light generated from the white/clear side lamp 62 during the N-th main scanning processing at step S157 shown in FIG. 10 is further irradiated onto the white ink layer 101 (N). In this way, since the integrated amount irradiated onto the white ink layer 101 (N) is increased, the printer 1A can reliably cure the white ink layer 101 (N).

The color/clear print processing (step S115 or step S125) will be described with reference to FIG. 12. In the color/clear print processing at step S115 shown in FIG. 8 and in the color/clear print processing at step S125 shown in FIG. 9, the position in the up-down direction of the platen 5 shown in FIG. 2 is different, and the content of each of the processing is the same. In the normal print mode, the CPU 41 performs the color/clear print processing at step S115 shown in FIG. 8 with the platen 5 positioned at the raised position P1 shown in FIG. 2. In the gloss print mode, the CPU 41 performs the color/clear print processing at step S125 shown in FIG. 9 with the platen 5 at the lowered position P2 shown in FIG. 2.

When the color/clear print processing is started, the CPU 41 sets "left" as the main scanning direction (step S201). The CPU 41 sets the white ink to "OFF" (step S202). The CPU 41 sets the color ink to "ON" (step S203). The CPU 41 sets the clear ink to "ON" (step S204). The CPU 41 sets the white/clear side lamp 62 to "ON" (step S205). The CPU 41 sets the color side lamp 61 to "ON" (step S206).

The CPU 41 performs the main scanning processing on the basis of the settings at step S201 to step S206 (step S207). In the main scanning processing at step S207, in the movement control, the CPU 41 drives the main scanning motor 31 on the basis of the detection result from the encoder 311 shown in FIG. 4, and moves the carriage 20 shown in FIG. 1 to the left from the right end of the printing region 10 to the left end of the printing region 10. While executing the movement control, in the ejection control, the CPU 41 causes the white/clear head 52 shown in FIG. 3 to stop the ejection of the white ink from the nozzle row 52W. While executing the movement control, in the ejection control, the CPU 41 drives the head drive portion 33 shown in FIG. 4 on the basis of the print data, and causes the white/clear head 52 shown in FIG. 3 to eject the clear ink from the nozzle row 52L. While executing the movement control, in the ejection control, the CPU 41 drives the head drive portion 33 shown in FIG. 4 on the basis of the print data, and causes the color head 51 shown in FIG. 3 to eject the color inks from the nozzle rows 51Y, 51M, 51C, and 51K. While executing the movement control, in the irradiation control, the CPU 41 causes the plurality of ultraviolet light-emitting diodes 624 shown in FIG. 2 to be illuminated, and irradiates the ultraviolet light toward the object to be printed M from the white/clear side lamp 62. The ultraviolet light from the white/clear side lamp 62 is irradiated onto the clear ink layer 103 shown in FIG. 5 and FIG. 6. While executing the movement control, in the irradiation control, the CPU 41 causes the plurality of ultraviolet light-emitting diodes 614 shown in FIG. 2 to be illuminated, and irradiates the ultraviolet light toward the object to be printed M from the color side lamp 61. The ultraviolet light from the color side lamp 61 is irradiated onto the color ink layer 102 shown in FIG. 5 and FIG. 6.

The CPU 41 sets "right" as the main scanning direction (step S211). The CPU 41 sets the white ink to "OFF" (step S212). The CPU 41 sets the color ink to "OFF" (step S213). The CPU 41 sets the clear ink to "OFF" (step S214). The CPU 41 sets the white/clear side lamp 62 to "ON" (step S215). The CPU 41 sets the color side lamp 61 to "ON" (step S216).

The CPU 41 performs the main scanning processing on the basis of the settings at step S211 to step S216 (step S217). In the main scanning processing at step S217, in the movement control, the CPU 41 drives the main scanning motor 31 on the basis of the detection result from the encoder 311 shown in FIG. 4, and moves the carriage 20 shown in FIG. 1 to the right from the left end of the printing region 10 to the right end of the printing region 10. While executing the movement control, in the ejection control, the CPU 41 causes the white/clear head 52 shown in FIG. 3 to stop the ejection of the white ink from the nozzle row 52W. While executing the movement control, in the ejection control, the CPU 41 causes the white/clear head 52 shown in FIG. 3 to stop the ejection of the clear ink from the nozzle row 52L. While executing the movement control, in the ejection control, the CPU 41 causes the color head 51 shown in FIG. 3 to stop the ejection of the color inks from the nozzle rows 51Y, 51M, 51C, and 51K. While executing the movement control, in the irradiation control, the CPU 41 causes the plurality of ultraviolet light-emitting diodes 624 shown in FIG. 2 to be illuminated, and irradiates the ultraviolet light toward the object to be printed M from the white/clear side lamp 62. The ultraviolet light from the white/clear side lamp 62 is irradiated onto the clear ink layer 103 shown in FIG. 5 and FIG. 6. While executing the movement control, in the irradiation control, the CPU 41 causes the plurality of ultraviolet light-emitting diodes 614 shown in FIG. 2 to be illuminated, and irradiates the ultraviolet light toward the object to be printed M from the color side lamp 61. The ultraviolet light from the color side lamp 61 is irradiated onto the color ink layer 102 shown in FIG. 5 and FIG. 6.

On the basis of the print data, the CPU 41 determines whether, of the object to be printed M shown in FIG. 5 and FIG. 6, the formation of both the color ink layer 102 and the clear ink layer 103 is complete on all of the region on which the image is to be printed (step S218). When, of the object to be printed M shown in FIG. 5 and FIG. 6, the formation of either of the color ink layer 102 or the clear ink layer 103 is not complete on the region on which the image is to be printed (no at step S218), the CPU 41 sets "rearward" as the sub-scanning direction (step S221). The CPU 41 performs the sub-scanning processing on the basis of the setting at step S221 (step S222). In the sub-scanning processing at step S222, the CPU 41 controls the sub-scanning motor 32 on the basis of the detection result from the encoder 321 shown in FIG. 4, and moves the platen 5 shown in FIG. 2 rearward. When the platen 5 moves rearward by a predetermined movement amount, the CPU 41 stops the sub-scanning motor 32 shown in FIG. 4. The CPU 41 shifts the processing to step S201.

The CPU 41 repeats the main scanning processing (step S207 and step S217) and the sub-scanning processing (step S222) until, of the object to be printed M shown in FIG. 5 and FIG. 6, the formation of both the color ink layer 102 and the clear ink layer 103 is complete on all the region on which the image is to be printed. When, of the object to be printed M shown in FIG. 5 and FIG. 6, the formation of both the color ink layer 102 and the clear ink layer 103 is complete on all the region on which the image is to be printed (yes at step S218), the CPU 41 returns the processing to the normal print processing shown in FIG. 8 or the gloss print processing shown in FIG. 9.

A formation mode of the color ink layer 102 and the clear ink layer 103 in the color/clear print processing (step S115 or step S125) will be described with reference to FIG. 13. FIG. 13 shows the white ink layer 101 using oblique solid lines, the color ink layer 102 using vertical solid lines, and the clear ink layer 103 using oblique dotted lines. FIG. 13 shows a positional relationship in the front-rear direction between the carriage 20 and the object to be printed M when the N-th main scanning processing at step S217 shown in FIG. 12 has been completed.

Figure 12:
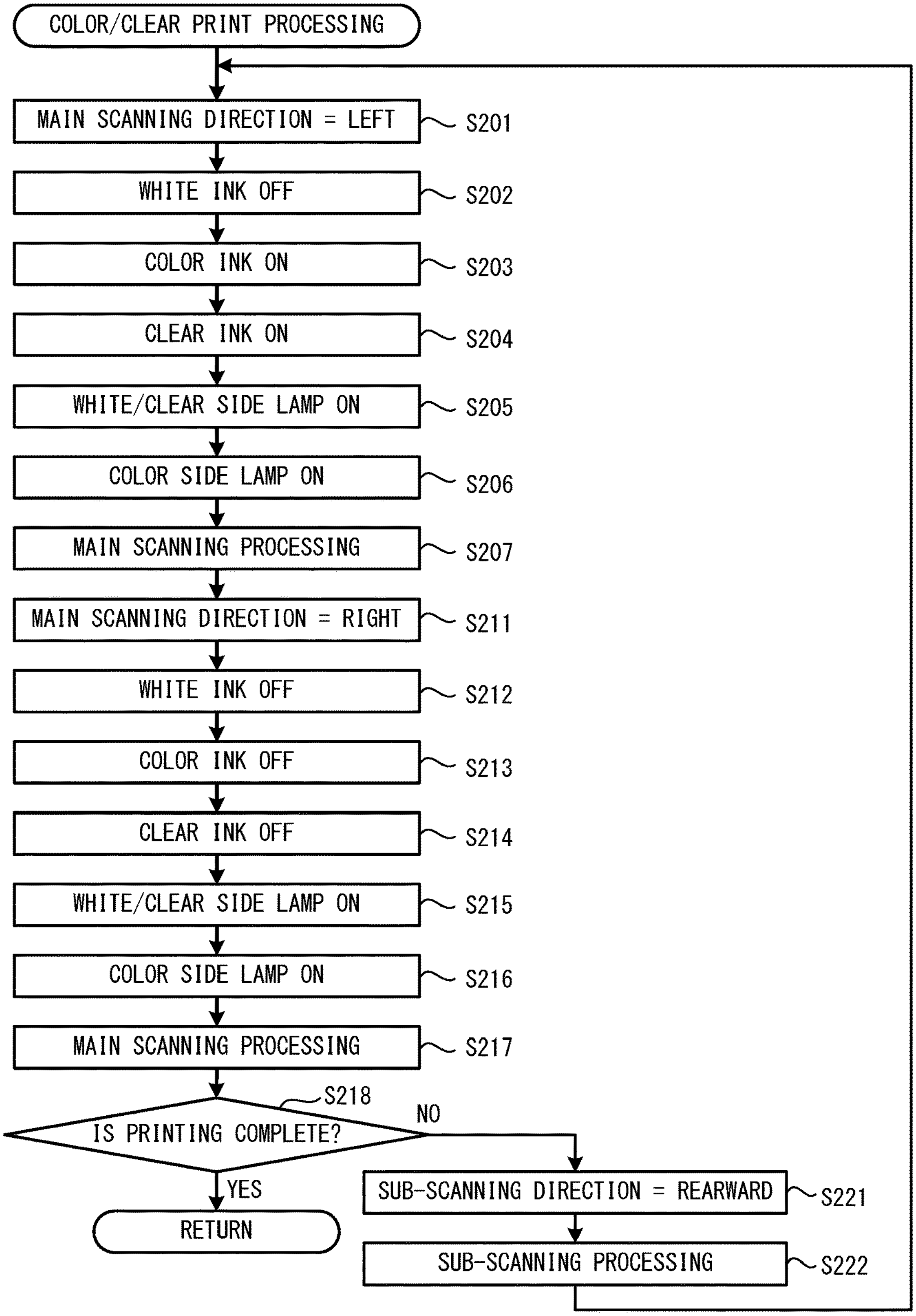
FIG. 12 is a flowchart of color/clear print processing.
Figure 13:
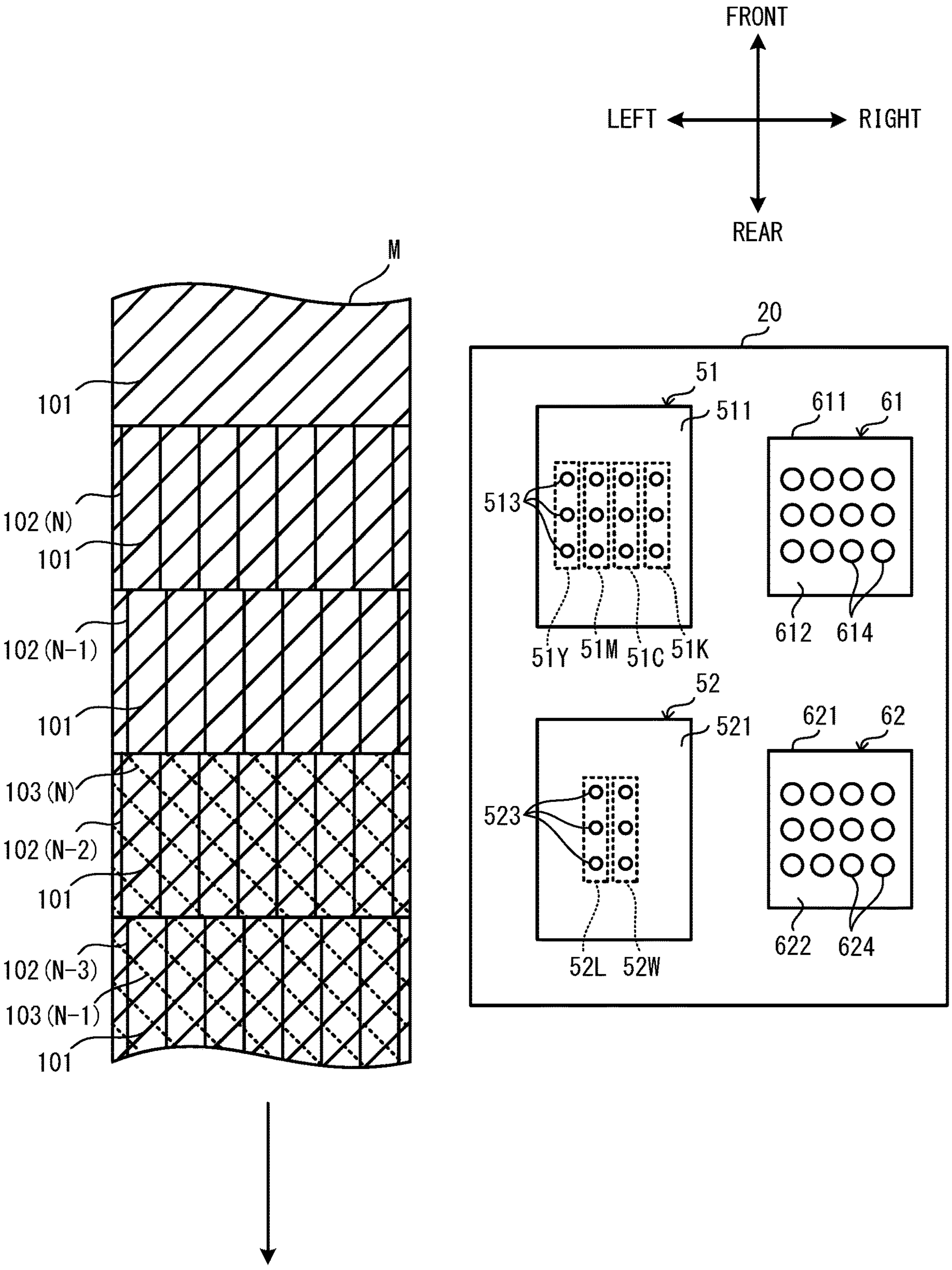
FIG. 13 is a diagram illustrating a formation mode of a color ink layer and a clear ink layer by the color/clear print processing.

In the N-th main scanning processing at step S207 shown in FIG. 12, a color ink layer 102 (N) is formed on the white ink layer 101, on the object to be printed M, by the ejection of the color ink from the color head 51. According to the configuration of the embodiment, in the main scanning processing at step S207 shown in FIG. 12, the carriage 20 moves from the right to the left, and the color side lamp 61 is positioned further to the right than the color head 51, that is, on the opposite side to the movement direction of the carriage 20. Thus, the ultraviolet light generated from the color side lamp 61 during the N-th main scanning processing at step S207 shown in FIG. 12 is irradiated onto the color ink layer 102 (N). In this way, the curing of the color ink layer 102 (N) is promoted.

The ultraviolet light generated from the color side lamp 61 during the N-th main scanning processing at step S217 shown in FIG. 12 is further irradiated onto the color ink layer 102 (N). In this way, since the integrated amount irradiated onto the color ink layer 102 (N) is increased, the printer 1A can reliably cure the color ink layer 102 (N).

In the sub-scanning processing at step S222 shown in FIG. 12, the platen 5 shown in FIG. 2 moves from the front to the rear, that is, in the direction from the color head 51 toward the white/clear head 52. As a result, in the N-th main scanning processing at step S207 described above, that is, in the main scanning processing at step S207 that forms the color ink layer 102 (N), by the ejection of the clear ink from the white/clear head 52, a clear ink layer 103 (N) is further formed, on the object to be printed M, on a color ink layer 102 (N−K). Note that FIG. 13 shows an example when K is 2.

According to the configuration of the embodiment, in the main scanning processing at step S207, the carriage 20 moves from the right to the left, and the white/clear side lamp 62 is positioned further to the right than the white/clear head 52, that is, on the opposite side to the movement direction of the carriage 20. Thus, the ultraviolet light generated from the white/clear side lamp 62 during the N-th main scanning processing at step S207 shown in FIG. 12 is irradiated onto the clear ink layer 103 (N). In this way, the curing of the clear ink layer 103 (N) is promoted.

The ultraviolet light generated from the white/clear side lamp 62 during the N-th main scanning processing at step S217 shown in FIG. 12 is further irradiated onto the clear ink layer 103 (N). In this way, since the integrated amount irradiated onto the clear ink layer 103 (N) is increased, the printer 1A can reliably cure the clear ink layer 103 (N).

In the manner described above, as the ink layer 100, the white ink layer 101, the color ink layer 102, and the clear ink layer 103 are formed from the upper surface of the object to be printed M upward, in order of the white ink layer 101, the color ink layer 102, and the clear ink layer 103.

A degree of advancement of the smoothing of the ink layer 100 changes depending on the illuminance, and the like. For example, the smaller the illuminance, the slower a curing speed of the ink layer 100 is likely to become, and thus, the smoothing of the ink layer 100 is more likely to advance. The illuminance changes depending on the irradiation distance L, and the like. For example, the larger the irradiation distance L, the smaller the illuminance becomes. Thus, the illuminance is smaller when the platen 5 is positioned at the lowered position P2 than when the platen 5 is positioned at the raised position P1.

Figure 8:
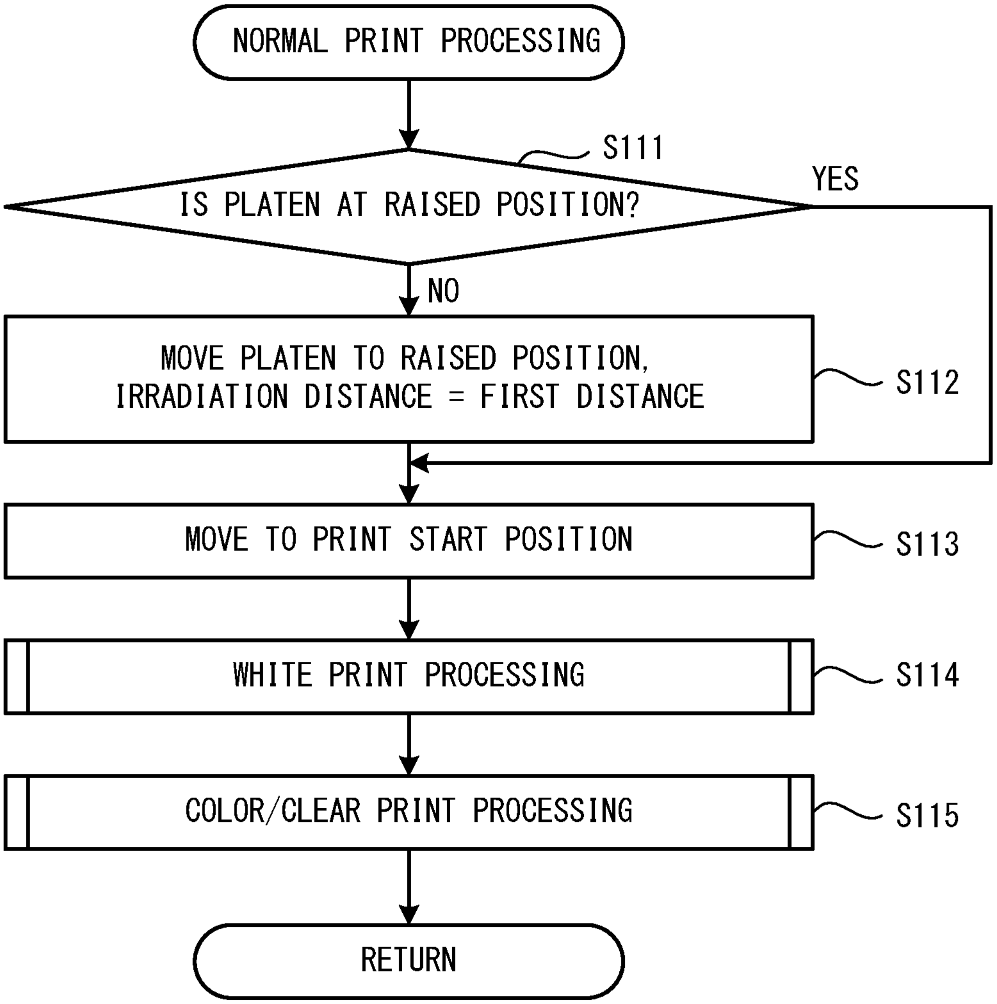
FIG. 8 is a flowchart of normal print processing.

In the normal print mode, the CPU 41 performs the color/clear print processing at step S115 shown in FIG. 8 with the platen 5 positioned at the raised position P1 shown in FIG. 2. Thus, in the normal print mode, since the illuminance is relatively large, the smoothing of the color ink layer 102 and the clear ink layer 103 is relatively unlikely to advance. As a result, in the normal print mode, the color ink layer 102 and the clear ink layer 103 shown in FIG. 5 have surface unevenness. In this way, in the normal print mode, the matte finish printed object 100A shown in FIG. 5 is created.

On the other hand, in the gloss print mode, the CPU 41 performs the color/clear print processing at step S125 shown in FIG. 9 with the platen 5 positioned at the lowered position P2 shown in FIG. 2. Thus, in the gloss print mode, compared to the normal print mode, the illuminance is small, and thus the smoothing of the color ink layer 102 and the clear ink layer 103 is more likely to advance. As a result, in the gloss print mode, the color ink layer 102 and the clear ink layer 103 shown in FIG. 6 do not have the surface unevenness, or have a lesser surface unevenness than the color ink layer 102 and the clear ink layer 103 shown in FIG. 5. Thus, the gloss finish printed object 100B shown in FIG. 6 has a glossier finish than the matte finish printed object 100A shown in FIG. 5. In this way, in the gloss print mode, the gloss finish printed object 100B shown in FIG. 6 is created.

As described above, in the embodiment, in the gloss print mode, the white print processing at step 124 is performed with the platen 5 positioned at the lowered position P2, that is, in the state in which the irradiation distance L is the second distance L2. Thus, the printer 1A can suppress the occurrence of the striped pattern in the white ink layer 101, compared to when the white print processing at step S124 is performed in the state in which the irradiation distance L is the first distance L1. In the gloss print mode, the color/clear print processing at step S125 is performed with the platen 5 positioned at the lowered position P2, that is, in the state in which the irradiation distance L is the second distance L2. Thus, the printer 1A can suppress the occurrence of the striped pattern in the color ink layer 102 and the clear ink layer 103, compared to when the color/clear print processing at step S125 is performed in the state in which the irradiation distance L is the first distance L1. In the normal print mode, the white print processing at step S114 is performed with the platen 5 positioned at the raised position P1, that is, in the state in which the irradiation distance L is the first distance L1. Thus, the printer 1A can suppress the ink discharge failure by the color head 51 and the white/clear head 52, compared to when the white print processing at step S114 is performed in the state in which the irradiation distance L is the second distance L2. In the normal print mode, the color/clear print processing at step S115 is performed with the platen 5 positioned at the raised position P1, that is, in the state in which the irradiation distance L is the first distance L1. Thus, the printer 1A can suppress the ink discharge failure by the color head 51 and the white/clear head 52, compared to when the color/clear print processing at step S115 is performed in the state in which the irradiation distance L is the second distance L2. As a result, the printer 1A can suppress the occurrence of the striped pattern in the ink layer 100 in the gloss print mode, and can suppress the ink discharge failure in the normal print mode, and can thus improve the print quality.

The direction from the right to the left is the direction from the color side lamp 61 toward the color head 51, and is the direction from the white/clear side lamp 62 toward the white/clear head 52. In the normal print mode and the gloss print mode, in the main scanning processing at step S147 or at step S207, when the carriage 20 is moved from the right to the left by the movement control, the color inks are ejected from the color head 51, or the white ink or the clear ink is ejected from the white/clear head 52 by the ejection control. In the main scanning processing at step S147 or step S207, when the carriage 20 is moved from the right to the left by the movement control, the ultraviolet light is irradiated from the color side lamp 61 onto the color ink layer 102, or the ultraviolet light is irradiated from the white/clear side lamp 62 onto the white ink layer 101 or the clear ink layer 103 by the irradiation control. In this way, the printer 1A can both form the ink layer 100 (N) and cure the formed ink layer 100 (N) when moving the carriage 20 from the right to the left for the N-th time. Thus, in the gloss print mode, for example, the printer 1A can shorten a processing time required for the printing, while suppressing the occurrence of the striped pattern in the ink layer 100. In the normal print mode, for example, the printer 1A can shorten the processing time required for the printing while suppressing the ink discharge failure by the color head 51 and the white/clear head 52.

The white/clear head 52 is aligned with the color head 51 in the front-rear direction. The color side lamp 61 is aligned with the color head 51 in the left-right direction. The white/clear side lamp 62 is aligned with the white/clear head 52 in the left-right direction. Thus, in comparison to when the color head 51, the white/clear head 52, the color side lamp 61, and the white/clear side lamp 62 are aligned with each other in the left-right direction, the printer 1A can suppress an increase in the size of the device in the left-right direction.

The CPU 41 causes the irradiation distance L to be the first distance L1 or the second distance L2 by moving the platen 5 in the up-down direction. Thus, the printer 1A can cause the irradiation distance L to be changed, without moving the color side lamp 61 and the white/clear side lamp 62 in the up-down direction. As a result, the printer 1A can control the irradiation distance L to be the first distance L1 or the second distance L2, while suppressing the color side lamp 61 and the white/clear side lamp 62 from colliding with members positioned above the color side lamp 61 and the white/clear side lamp 62, for example.

For example, the ink is less likely to attach to the object to be printed M that is plastic, metal, ceramic, or the like, than to the general object to be printed M that is a cloth, paper, or the like. In the embodiment, since the ink is ultraviolet curable, the printer 1A can also print the object to be printed M to which the ink is relatively less likely to attach. Thus, the printer 1A can diversify the material and the like of the object to be printed M. In a modified example and another modified example to be described below, a printer 1B and a printer 1C can achieve the same effect.

The color head 51 ejects the color inks. The white/clear head 52 ejects the clear ink. Thus, in the gloss print mode, the printer 1A can improve the glossiness of a print image by smoothing the color ink layer 102 and the clear ink layer 103. In the modified example and the other modified example to be described below, the printer 1B and the printer 1C can achieve the same effect.

The white/clear head 52 ejects the white ink. Thus, the printer 1A can form the color ink layer 102 on the white ink layer 101. As a result, the printer 1A can improve the color development of the color inks. In the modified example and the other modified example to be described below, the printer 1B and the printer 1C can achieve the same effect.

Figure 14:
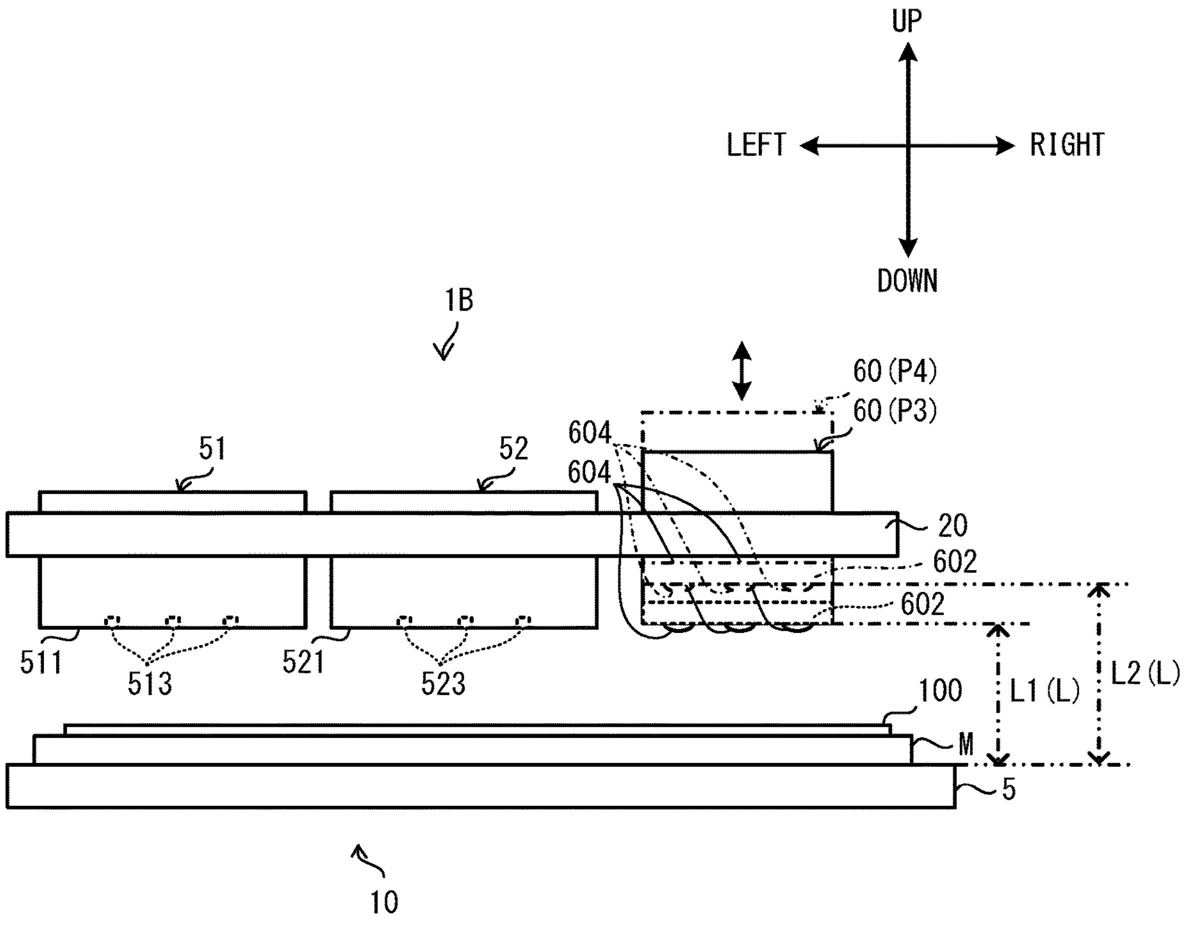
FIG. 14 is a schematic diagram of a printer as viewed from the front.

The printer 1B according to the modified example of the present disclosure will be described with reference to FIG. 14 to FIG. 22. In a similar manner to the printer 1A shown in FIG. 1, the printer 1B shown in FIG. 14 is an inkjet-type UV printer. The printer 1B differs from the printer 1A in that the positional relationship between the color side lamp 61 and the white/clear side lamp 62 is different in the front-rear direction and the left-right direction. Furthermore, the printer 1B differs from the printer 1A in that, in place of the color side lamp 61 and the white/clear side lamp 62 shown in FIG. 2, the printer 1B is provided with a lamp 60 shown in FIG. 14. The remaining mechanical configuration of the printer 1B is the same as the mechanical configuration of the printer 1A. In the modified example, the members that have the same or equivalent functions as those of the above-described embodiment are assigned with the same or corresponding reference signs as those of the above-described embodiment, and a description thereof will be omitted or simplified.

Figure 15:
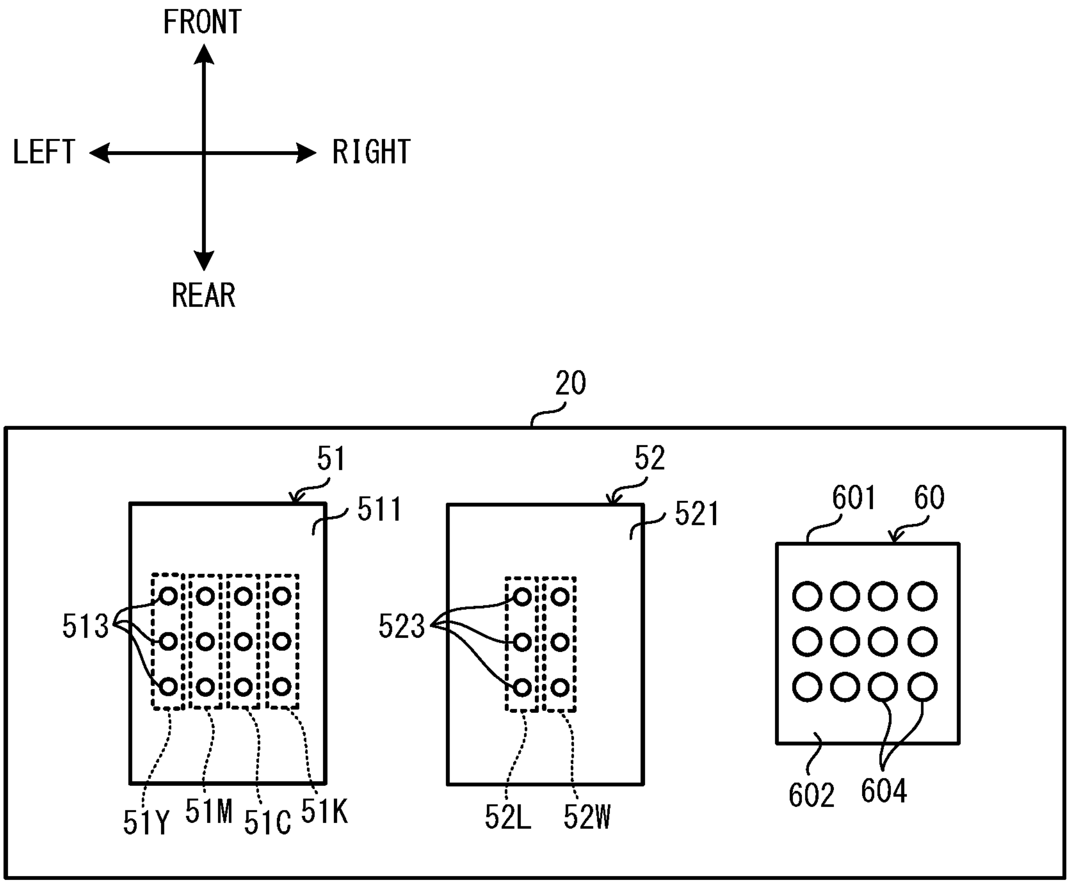
FIG. 15 is a schematic diagram of the carriage according to a modified example, as viewed from below.

The mechanical configuration of the printer 1B will be described with reference to FIG. 14 and FIG. 15. In the printer 1B, the color head 51, the white/clear head 52, and the lamp 60 are aligned from the left to the right in the order of the color head 51, the white/clear head 52, and the lamp 60. The lamp 60 is provided with a housing 601, a substrate 602, and a plurality of ultraviolet light-emitting diodes 604. The housing 601 has a cuboid shape, and is supported by the carriage 20. The lower end of the housing 601 is exposed downward from the carriage 20. The substrate 602 is provided at the lower end of the housing 601. The substrate 602 has a rectangular shape as viewed from below, and extends in the front-rear direction and the left-right direction. As shown in FIG. 14, the substrate 602 is positioned higher than the platen 5 and faces the platen 5 from above. As shown in FIG. 15, the plurality of ultraviolet light-emitting diodes 604 are provided in a lattice pattern at the lower surface of the substrate 602. The plurality of ultraviolet light-emitting diodes 604 emit ultraviolet light by being illuminated.

The lamp 60 moves in the up-down direction between a lowered position P3 and a raised position P4. In the modified example, in a similar manner to the embodiment, the irradiation distance L indicates the distance, in the up-down direction, between the upper surface of the platen 5 and the ultraviolet light-emitting diodes 604. The lowered position P3 is the position of the lamp 60, in the up-down direction, when the irradiation distance L is the first distance L1. The raised position P4 is the position of the lamp 60, in the up-down direction, when the irradiation distance L is the second distance L2.

The electrical configuration of the printer 1B will be described with reference to FIG. 16. The CPU 41 is electrically connected to the plurality of ultraviolet light-emitting diodes 604, in place of the plurality of ultraviolet light-emitting diodes 614 and the plurality of ultraviolet light-emitting diodes 624, and is further connected to a raising/lowering motor 35. The plurality of ultraviolet light-emitting diodes 604 and the raising/lowering motor 35 are driven by control of the CPU 41. The lamp 60 shown in FIG. 14 moves in the up-down direction as a result of the driving of the raising/lowering motor 35. An encoder 351 is provided at the raising/lowering motor 35. The encoder 351 detects a rotation angle of the raising/lowering motor 35, and outputs a detection signal to the CPU 41. The remaining electrical configuration of the printer 1B is the same as the electrical configuration of the printer 1A.

The main processing will be described with reference to FIG. 17 to FIG. 22. In the printer 1B, the CPU 41 performs the main processing shown in FIG. 17 in place of the main processing shown in FIG. 7. A description of the processing of the main processing shown in FIG. 17 that is the same as the processing of the main processing shown in FIG. 7 will be omitted or simplified. The user places the object to be printed M on the platen 5 shown in FIG. 14. The user operates the operation portion 37 shown in FIG. 16 and inputs the print command to the printer 1B. When the print command is input, the CPU 41 performs the main processing shown in FIG. 17 by reading out and executing the control program from the ROM 42.

Figure 17:
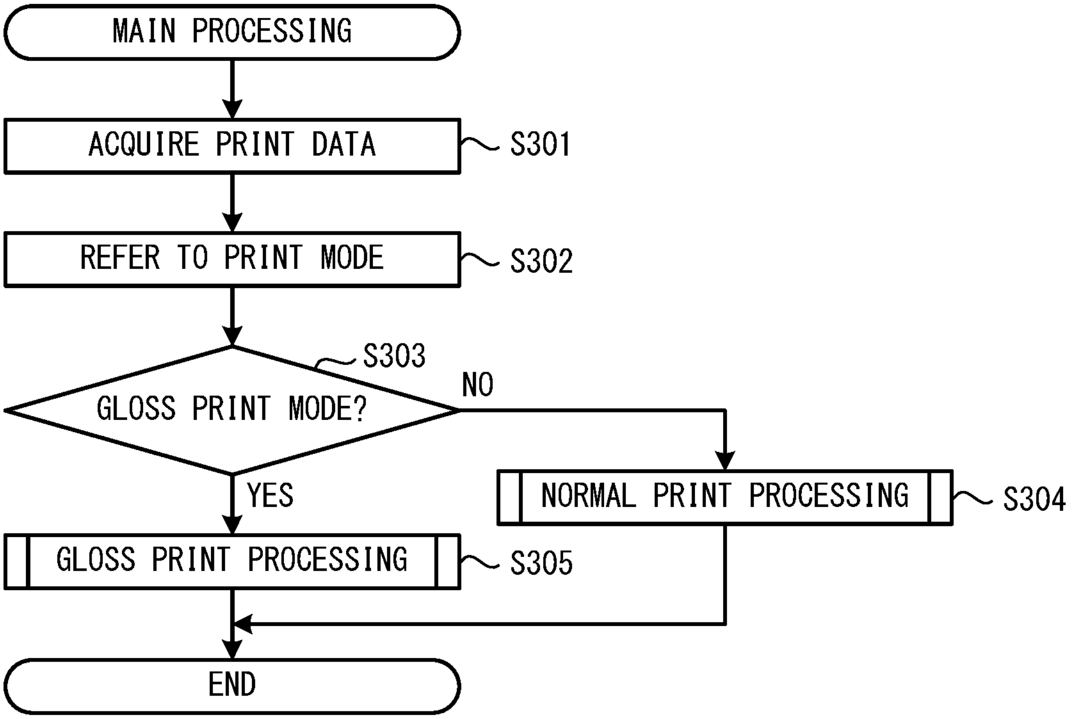
FIG. 17 is a flowchart of the main processing.

Hereinafter, the description will be given using cases in which the matte finish printed object 100A shown in FIG. 5 or the gloss finish printed object 100B shown in FIG. 6 are created as examples. When the main processing shown in FIG. 17 is started, it is assumed that the platen 5 is positioned at the set position shown in FIG. 1, and the carriage 20 is positioned at the stand-by position shown in FIG. 1. In the main scanning processing to be described below, a setting that is made to illuminate the ultraviolet light-emitting diodes 604 will be referred to as "switching the lamp 60 ON," and a setting that is made to extinguish the ultraviolet light-emitting diodes 604 will be referred to as "switching the lamp 60 OFF."

As shown in FIG. 17, when the main processing is started, the CPU 41 performs processing at step S301 and step S302, and performs a determination at step S303. The processing at step S301 and step S302, and the determination at step S303 are, respectively, the same as the processing at step S101 and step S102, and the determination at step S103 shown in FIG. 7.

Figure 18:
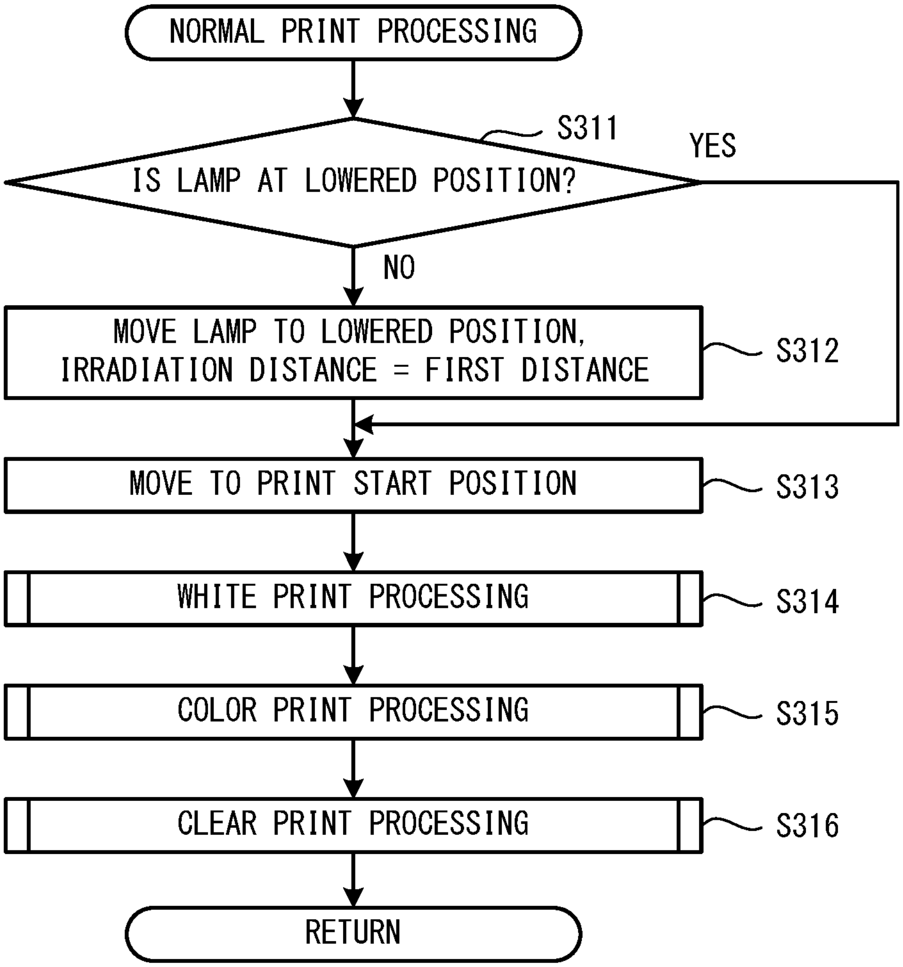
FIG. 18 is a flowchart of the normal print processing.

When the set print mode is the normal print mode (no at step S303), the CPU 41 performs the normal print processing shown in FIG. 18 (step S304). In the normal print processing, the matte finish printed object 100A shown in FIG. 5 is created. The CPU 41 ends the main processing. When the set print mode is the gloss print mode (yes at step S303), the CPU 41 performs the gloss print processing shown in FIG. 19 (step S305). In the gloss print processing, the gloss finish printed object 100B shown in FIG. 6 is created. The CPU 41 ends the main processing.

The normal print processing (S304) will be described with reference to FIG. 18. When the normal print processing is started, the CPU 41 determines, on the basis of a detection result from the encoder 351 shown in FIG. 16, whether the lamp 60 is positioned at the lowered position P3 shown in FIG. 14 (step S311). When the lamp 60 is positioned at the lowered position P3 shown in FIG. 14 (yes at step S311), the CPU 41 shifts the processing to step S313.

Figure 16:
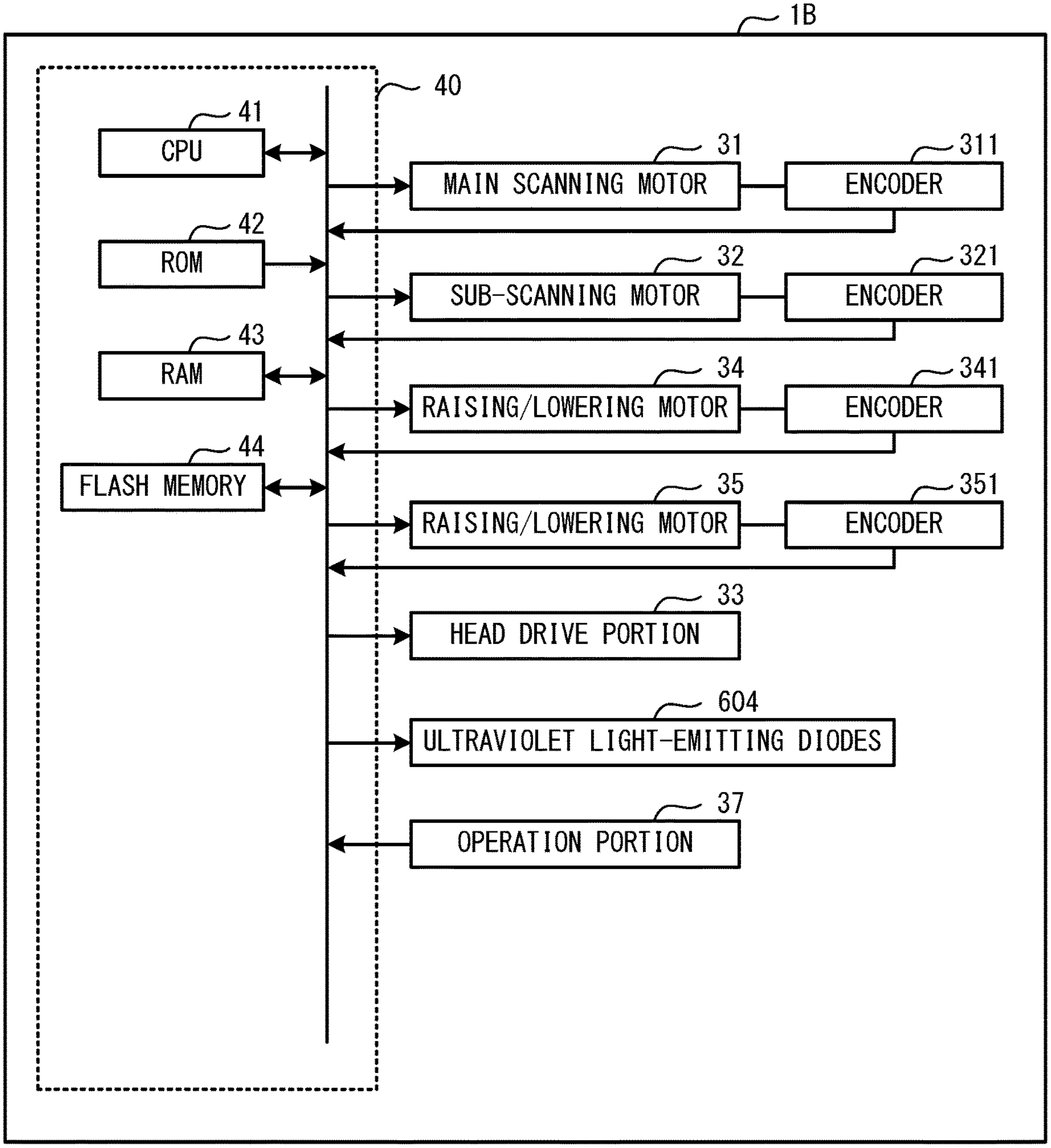
FIG. 16 is a block diagram showing an electrical configuration of the printer.

When the lamp 60 is not positioned at the lowered position P3 shown in FIG. 14 (no at step S311), the CPU 41 controls the raising/lowering motor 35 on the basis of the detection result from the encoder 351 shown in FIG. 16, and moves the lamp 60 to the lowered position P3 shown in FIG. 14 (step S312). As a result, the irradiation distance L becomes the first distance L1 shown in FIG. 14. The CPU 41 shifts the processing to step S313.

The CPU 41 controls the sub-scanning motor 32 on the basis of the detection result from the encoder 321 shown in FIG. 16, and moves the platen 5 shown in FIG. 14 to the rear from the set position shown in FIG. 1 to the platen print start position (not shown in the drawings) (step S313). As described above, when the platen 5 is positioned at the platen print start position, the front end of the region (not shown in the drawings) on which the image is to be printed, of the object to be printed M shown in FIG. 14, is disposed further to the rear than the white/clear head 52 shown in FIG. 14. The CPU 41 controls the main scanning motor 31 on the basis of the detection result from the encoder 311 shown in FIG. 4, and moves the carriage 20 shown in FIG. 1 to the right from the stand-by position, to the carriage print start position (not shown in the drawings) (step S313). As described above, when the carriage 20 is positioned at the carriage print start position, the color head 51 and the white/clear head 52 shown in FIG. 14 are disposed further to the right than the right end of the region (not shown in the drawings) on which the image is to be printed, of the object to be printed M.

The CPU 41 performs the white print processing (step S314). In the white print processing at step S314, while the platen 5 moves forward from the platen print start position, the white ink layer 101 shown in FIG. 5 is formed on the object to be printed M. The CPU 41 performs color print processing (step S315). In the color print processing at step S315, while the platen 5 moves rearward, the color ink layer 102 shown in FIG. 5 is formed on the white ink layer 101, on the object to be printed M. The CPU 41 performs clear print processing (step S316). In the clear print processing at step S316, while the platen 5 moves forward, the clear ink layer 103 shown in FIG. 5 is formed on the color ink layer 102, on the object to be printed M. The CPU 41 returns the processing to the main processing shown in FIG. 17.

The gloss print processing (step S305) will be described with reference to FIG. 19. When the gloss print processing is started, the CPU 41 determines, on the basis of the detection result from the encoder 351 shown in FIG. 16, whether the lamp 60 is positioned at the raised position P4 shown in FIG. 14 (step S321). When the lamp 60 is positioned at the raised position P4 shown in FIG. 14 (yes at step S321), the CPU 41 shifts the processing to step S323.

When the lamp 60 is not positioned at the raised position P4 shown in FIG. 14 (no at step S321), the CPU 41 controls the raising/lowering motor 35 on the basis of the detection result from the encoder 351 shown in FIG. 16, and moves the lamp 60 to the raised position P4 shown in FIG. 14 (step S322). In this way, the irradiation distance L becomes the second distance L2 shown in FIG. 14. The CPU 41 shifts the processing to step S323.

The CPU 41 controls the sub-scanning motor 32 on the basis of the detection result from the encoder 321 shown in FIG. 16, and moves the platen 5 shown in FIG. 14 to the rear from the set position shown in FIG. 1 to the platen print start position (not shown in the drawings) (step S323). As described above, when the platen 5 is positioned at the platen print start position, the front end of the region (not shown in the drawings) on which the image is to be printed, of the object to be printed M shown in FIG. 14, is disposed further to the rear than the white/clear head 52 shown in FIG. 14. The CPU 41 controls the main scanning motor 31 on the basis of the detection result from the encoder 311 shown in FIG. 4, and moves the carriage 20 shown in FIG. 1 to the right from the stand-by position, to the carriage print start position (not shown in the drawings) (step S323). As described above, when the carriage 20 is positioned at the carriage print start position, the color head 51 and the white/clear head 52 shown in FIG. 14 are disposed further to the right than the right end of the region (not shown in the drawings) on which the image is to be printed, of the object to be printed M.

The CPU 41 performs the white print processing (step S324). In the white print processing at step S324, while the platen 5 moves forward from the platen print start position, the white ink layer 101 shown in FIG. 6 is formed on the object to be printed M. The CPU 41 performs the color print processing (step S325).

In the color print processing at step S325, while the platen 5 moves rearward from the platen print start position, the color ink layer 102 shown in FIG. 6 is formed on the white ink layer 101, on the object to be printed M. The CPU 41 performs the clear print processing (step S326).

In the clear print processing at step S326, while the platen 5 moves forward from the platen print start position, the clear ink layer 103 shown in FIG. 6 is formed on the color ink layer 102, on the object to be printed M. The CPU 41 returns the processing to the main processing shown in FIG. 17.

The white print processing (step S314 or step S324) will be described with reference to FIG. 20. In the white print processing at step S314 shown in FIG. 18 and the white print processing at step S324 shown in FIG. 19, the position in the up-down direction of the lamp 60 shown in FIG. 14 is different, and the content of each of the processing is the same. In the normal print mode, the CPU 41 performs the white print processing at step S314 shown in FIG. 18 with the lamp 60 positioned at the lowered position P3 shown in FIG. 14. In the gloss print mode, the CPU 41 performs the white print processing at step S324 shown in FIG. 19 with the lamp 60 positioned at the raised position P4 shown in FIG. 14.

When the white print processing is started, the CPU 41 sets "left" as the main scanning direction (step S341). The CPU 41 sets the white ink to "ON" (step S342). The CPU 41 sets the color ink to "OFF" (step S343). The CPU 41 sets the clear ink to "OFF" (step S344). The CPU 41 sets the lamp 60 to "ON" (step S345).

The CPU 41 performs the main scanning processing on the basis of the settings at step S341 to step S345 (step S346). In the main scanning processing at step S346, in the movement control, the CPU 41 drives the main scanning motor 31 on the basis of the detection result from the encoder 311 shown in FIG. 16, and moves the carriage 20 shown in FIG. 14 to the left from the right end of the printing region 10 to the left end of the printing region 10. While executing the movement control, in the ejection control, the CPU 41 drives the head drive portion 33 shown in FIG. 16 on the basis of the print data, and causes the white/clear head 52 shown in FIG. 15 to eject the white ink from the nozzle row 52W. While executing the movement control, in the ejection control, the CPU 41 causes the white/clear head 52 shown in FIG. 15 to stop the ejection of the clear ink from the nozzle row 52L. While executing the movement control, in the ejection control, the CPU 41 causes the color head 51 shown in FIG. 15 to stop the ejection of the color inks from the nozzle rows 51Y, 51M, 51C, and 51K. While executing the movement control, in the irradiation control, the CPU 41 causes the plurality of ultraviolet light-emitting diodes 604 shown in FIG. 14 to be illuminated, and irradiates the ultraviolet light toward the object to be printed M from the lamp 60. The ultraviolet light from the lamp 60 is irradiated onto the white ink layer 101 shown in FIG. 5 and FIG. 6.

The CPU 41 sets "right" as the main scanning direction (step S351). The CPU 41 sets the white ink to "OFF" (step S352). The CPU 41 sets the color ink to "OFF" (step S353). The CPU 41 sets the clear ink to "OFF" (step S354). The CPU 41 sets the lamp 60 to "ON" (step S355).

The CPU 41 performs the main scanning processing on the basis of the settings at step S351 to step S355 (step S356). In the main scanning processing at step S356, in the movement control, the CPU 41 drives the main scanning motor 31 on the basis of the detection result from the encoder 311 shown in FIG. 16, and moves the carriage 20 shown in FIG. 14 to the right from the left end of the printing region 10 to the right end of the printing region 10. While executing the movement control, in the ejection control, the CPU 41 causes the white/clear head 52 shown in FIG. 15 to stop the ejection of the white ink from the nozzle row 52W. While executing the movement control, in the ejection control, the CPU 41 causes the white/clear head 52 shown in FIG. 15 to stop the ejection of the clear ink from the nozzle row 52L. While executing the movement control, in the ejection control, the CPU 41 causes the color head 51 shown in FIG. 15 to stop the ejection of the color inks from the nozzle rows 51Y, 51M, 51C, and 51K. While executing the movement control, in the irradiation control, the CPU 41 causes the plurality of ultraviolet light-emitting diodes 604 shown in FIG. 14 to be illuminated, and irradiates the ultraviolet light toward the object to be printed M from the lamp 60. The ultraviolet light from the lamp 60 is irradiated onto the white ink layer 101 shown in FIG. 5 and FIG. 6.

On the basis of the print data, the CPU 41 determines whether, of the object to be printed M shown in FIG. 5, the formation of the white ink layer 101 is complete on all of the region on which the image is to be printed (step S357). When, of the object to be printed M shown in FIG. 5, the formation of the white ink layer 101 is not complete on all the region on which the image is to be printed (no at step S357), the CPU 41 sets "forward" as the sub-scanning direction (step S361).

The CPU 41 performs the sub-scanning processing on the basis of the setting at step S361 (step S362). In the sub-scanning processing at step S362, the CPU 41 controls the sub-scanning motor 32 on the basis of the detection result from the encoder 321 shown in FIG. 16, and moves the platen 5 shown in FIG. 14 forward. When the platen 5 shown in FIG. 14 moves forward by the predetermined movement amount, the CPU 41 stops the sub-scanning motor 32 shown in FIG. 16. The CPU 41 shifts the processing to step S341. When, of the object to be printed M shown in FIG. 5 and FIG. 6, the formation of the white ink layer 101 is complete on all of the region on which the image is to be printed (yes at step S357), the CPU 41 returns the processing to the normal print processing shown in FIG. 18 or the gloss print processing shown in FIG. 19.

According to the white print processing (step S314 or step S324), in the N-th main scanning processing at step S346, the white ink layer 101 (N) is formed on the object to be printed M shown in FIG. 5 and FIG. 6, by the ejection of the white ink from the white/clear head 52 shown in FIG. 15. The ultraviolet light generated from the lamp 60 shown in FIG. 15 during the N-th main scanning processing at step S346 is irradiated onto the white ink layer 101 (N) shown in FIG. 5 and FIG. 6. In this way, the curing of the white ink layer 101 (N) shown in FIG. 5 and FIG. 6 is promoted. The ultraviolet light generated from the lamp 60 shown in FIG. 15 during the N-th main scanning processing at step S356 is further irradiated onto the white ink layer 101 (N) shown in FIG. 5 and FIG. 6. In this way, since the amount of ultraviolet light irradiated onto the white ink layer 101 (N) shown in FIG. 5 and FIG. 6 increases, the printer 1B can reliably cure the white ink layer 101 (N). In the manner described above, the white ink layer 101 shown in FIG. 5 and FIG. 6 is formed on the object to be printed M.

Figure 21:
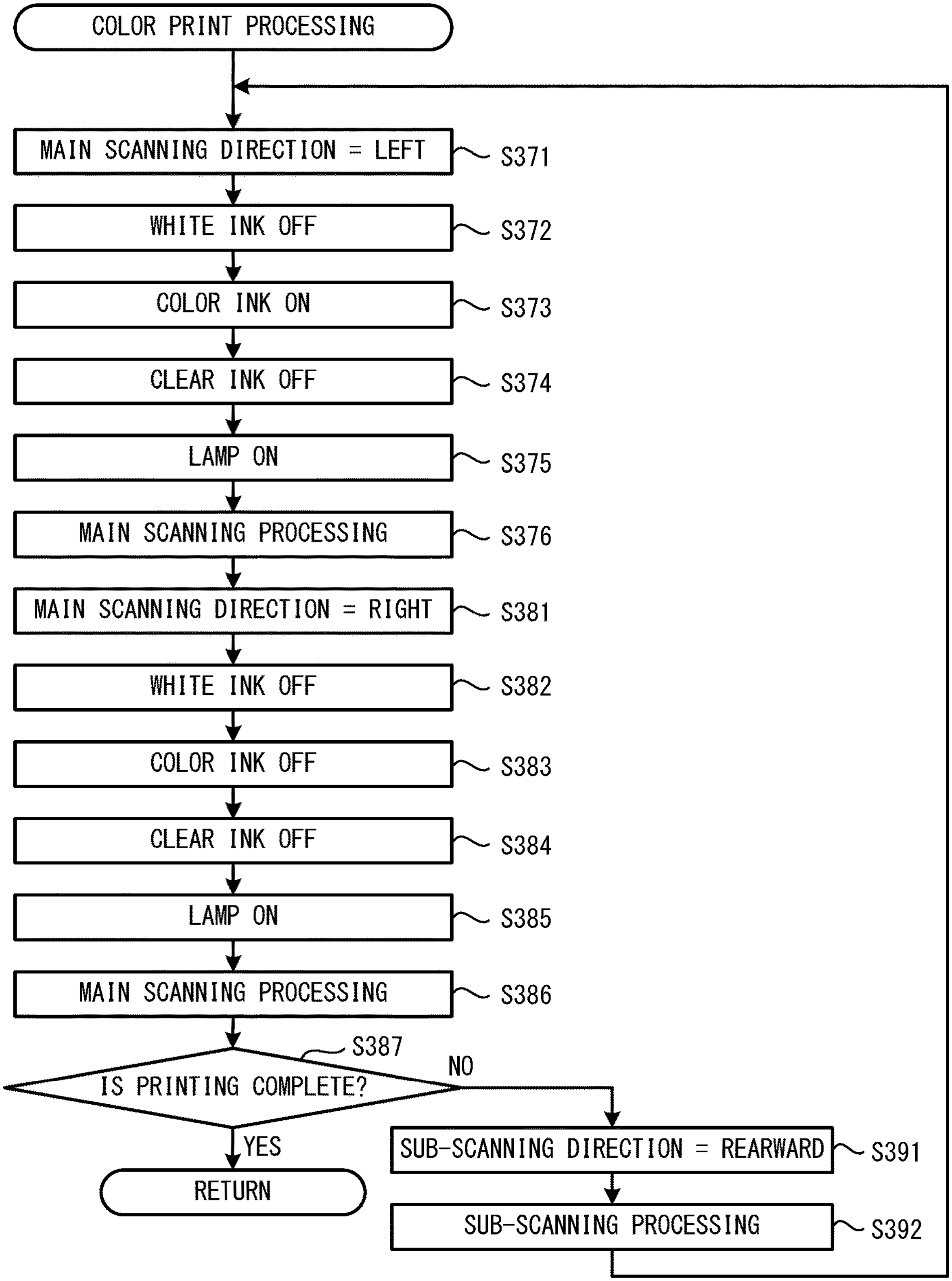
FIG. 21 is a flowchart of color print processing.

The color print processing (step S315 or step S325) will be described with reference to FIG. 21. In the color print processing at step S315 shown in FIG. 18 and the color print processing at step S325 shown in FIG. 19, the position in the up-down direction of the lamp 60 shown in FIG. 14 is different, and the content of each of the processing is the same. In the normal print mode, the CPU 41 performs the color print processing at step S315 shown in FIG. 18 with the lamp 60 positioned at the lowered position P3 shown in FIG. 14. In the gloss print mode, the CPU 41 performs the color print processing at step S325 shown in FIG. 19 with the lamp 60 positioned at the raised position P4 shown in FIG. 14.

When the color print processing is started, the CPU 41 sets "left" as the main scanning direction (step S371). The CPU 41 sets the white ink to "OFF" (step S372). The CPU 41 sets the color ink to "ON" (step S373). The CPU 41 sets the clear ink to "OFF" (step S374). The CPU 41 sets the lamp 60 to "ON" (step S375).

The CPU 41 performs the main scanning processing on the basis of the settings at step S371 to step S375 (step S376). In the main scanning processing at step S376, in the movement control, the CPU 41 drives the main scanning motor 31 shown in FIG. 16 on the basis of the detection result from the encoder 311, and moves the carriage 20 shown in FIG. 14 to the left from the right end of the printing region 10 to the left end of the printing region 10. While executing the movement control, in the ejection control, the CPU 41 causes the white/clear head 52 shown in FIG. 15 to stop the ejection of the white ink from the nozzle row 52W. While executing the movement control, in the ejection control, the CPU 41 causes the white/clear head 52 shown in FIG. 15 to stop the ejection of the clear ink from the nozzle row 52L. While executing the movement control, in the ejection control, the CPU 41 drives the head drive portion 33 shown in FIG. 16 on the basis of the print data, and causes the color head 51 shown in FIG. 15 to eject the color inks from the nozzle rows 51Y, 51M, 51C, and 51K. While executing the movement control, in the irradiation control, the CPU 41 causes the plurality of ultraviolet light-emitting diodes 604 shown in FIG. 14 to be illuminated, and irradiates the ultraviolet light toward the object to be printed M from the lamp 60. The ultraviolet light from the lamp 60 is irradiated onto the color ink layer 102 shown in FIG. 5 and FIG. 6.

The CPU 41 sets "right" as the main scanning direction (step S381). The CPU 41 sets the white ink to "OFF" (step S382). The CPU 41 sets the color ink to "OFF" (step S383). The CPU 41 sets the clear ink to "OFF" (step S384). The CPU 41 sets the lamp 60 to "ON" (step S385).

The CPU 41 performs the main scanning processing on the basis of the settings at step S381 to step S385 (step S386). In the main scanning processing at step S386, in the movement control, the CPU 41 drives the main scanning motor 31 on the basis of the detection result from the encoder 311 shown in FIG. 16, and moves the carriage 20 shown in FIG. 14 to the right from the left end of the printing region 10 to the right end of the printing region 10. While executing the movement control, in the ejection control, the CPU 41 causes the white/clear head 52 shown in FIG. 15 to stop the ejection of the white ink from the nozzle row 52W. While executing the movement control, in the ejection control, the CPU 41 causes the white/clear head 52 shown in FIG. 15 to stop the ejection of the clear ink from the nozzle row 52L. While executing the movement control, in the ejection control, the CPU 41 causes the color head 51 shown in FIG. 15 to stop the ejection of the color inks from the nozzle rows 51Y, 51M, 51C, and 51K. While executing the movement control, in the irradiation control, the CPU 41 causes the plurality of ultraviolet light-emitting diodes 604 shown in FIG. 14 to be illuminated, and irradiates the ultraviolet light toward the object to be printed M from the lamp 60. The ultraviolet light from the lamp 60 is irradiated onto the color ink layer 102 shown in FIG. 5 and FIG. 6.

On the basis of the print data, the CPU 41 determines whether, of the object to be printed M shown in FIG. 5 and FIG. 6, the formation of the color ink layer 102 is complete on all of the region on which the image is to be printed (step S387). When, of the object to be printed M shown in FIG. 5 and FIG. 6, the formation of the color ink layer 102 is not complete on all of the region on which the image is to be printed (no at step S387), the CPU 41 sets "rearward" as the sub-scanning direction (step S391).

The CPU 41 performs the sub-scanning processing on the basis of the setting at step S391 (step S392). In the sub-scanning processing at step S392, the CPU 41 controls the sub-scanning motor 32 on the basis of the detection result from the encoder 321 shown in FIG. 16, and moves the platen 5 shown in FIG. 14 rearward. When the platen 5 shown in FIG. 14 moves rearward by the predetermined movement amount, the CPU 41 stops the sub-scanning motor 32 shown in FIG. 16. The CPU 41 shifts the processing to step S371. When, of the object to be printed M shown in FIG. 5 and FIG. 6, the formation of the color ink layer 102 is complete on all of the region on which the image is to be printed (yes at step S387), the CPU 41 returns the processing to the normal print processing shown in FIG. 18 or to the gloss print processing shown in FIG. 19.

According to the color print processing (step S315 or step S325), in the N-th main scanning processing at step S376, the color ink layer 102 (N) is formed on the white ink layer 101, on the object to be printed M shown in FIG. 5 and FIG. 6, by the ejection of the color inks from the color head 51 shown in FIG. 15. The ultraviolet light generated from the lamp 60 shown in FIG. 15 during the N-th main scanning processing at step S376 is irradiated onto the color ink layer 102 (N) shown in FIG. 5 and FIG. 6. In this way, the curing of the color ink layer 102 (N) shown in FIG. 5 and FIG. 6 is promoted. The ultraviolet light generated from the lamp 60 shown in FIG. 15 during the N-th main scanning processing at step S386 is further irradiated onto the color ink layer 102 (N) shown in FIG. 5 and FIG. 6. In this way, since the amount of ultraviolet light irradiated onto the color ink layer 102 (N) shown in FIG. 5 and FIG. 6 increases, the printer 1B can reliably cure the color ink layer 102 (N). In the manner described above, the color ink layer 102 shown in FIG. 5 and FIG. 6 is formed on the white ink layer 101, on the object to be printed M.

In the normal print mode, the CPU 41 performs the color print processing at step S315 shown in FIG. 18 with the platen 5 positioned at the lowered position P3 shown in FIG. 14. Thus, in the normal print mode, the illuminance is relatively large, and thus the smoothing of the color ink layer 102 is less likely to advance. As a result, in the normal print mode, the color ink layer 102 shown in FIG. 5 has surface unevenness.

Figure 19:
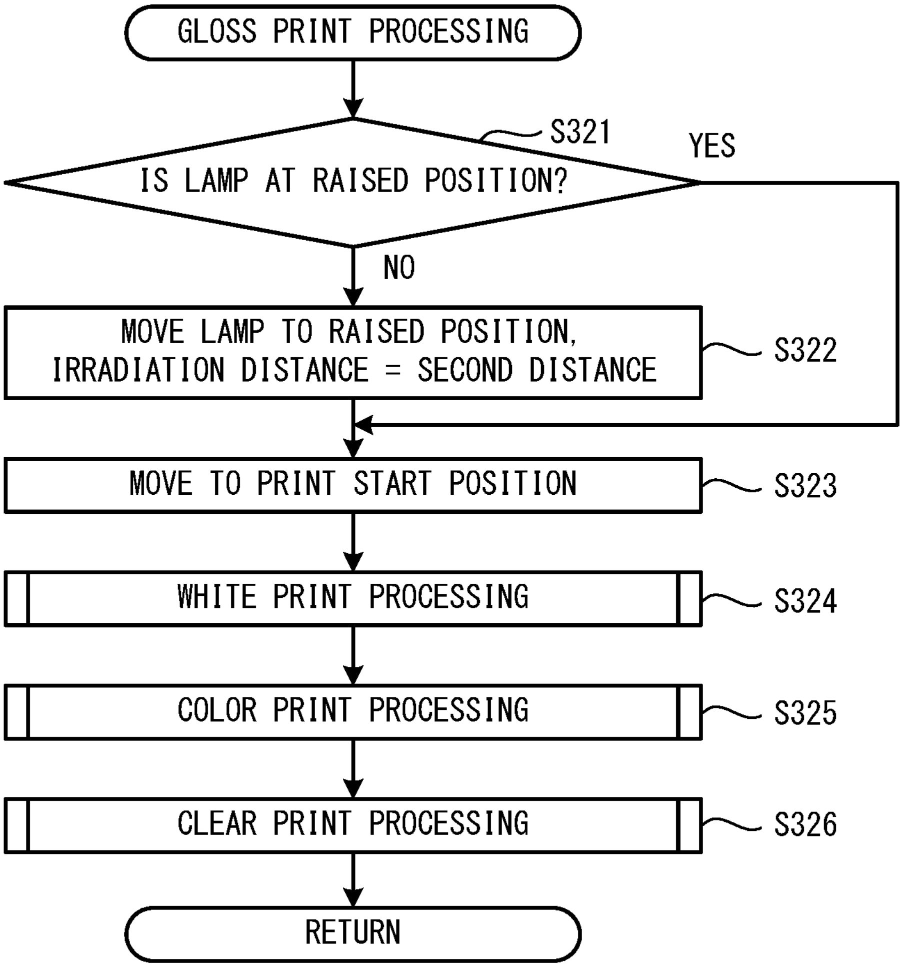
FIG. 19 is a flowchart of the gloss print processing.
Figure 20:
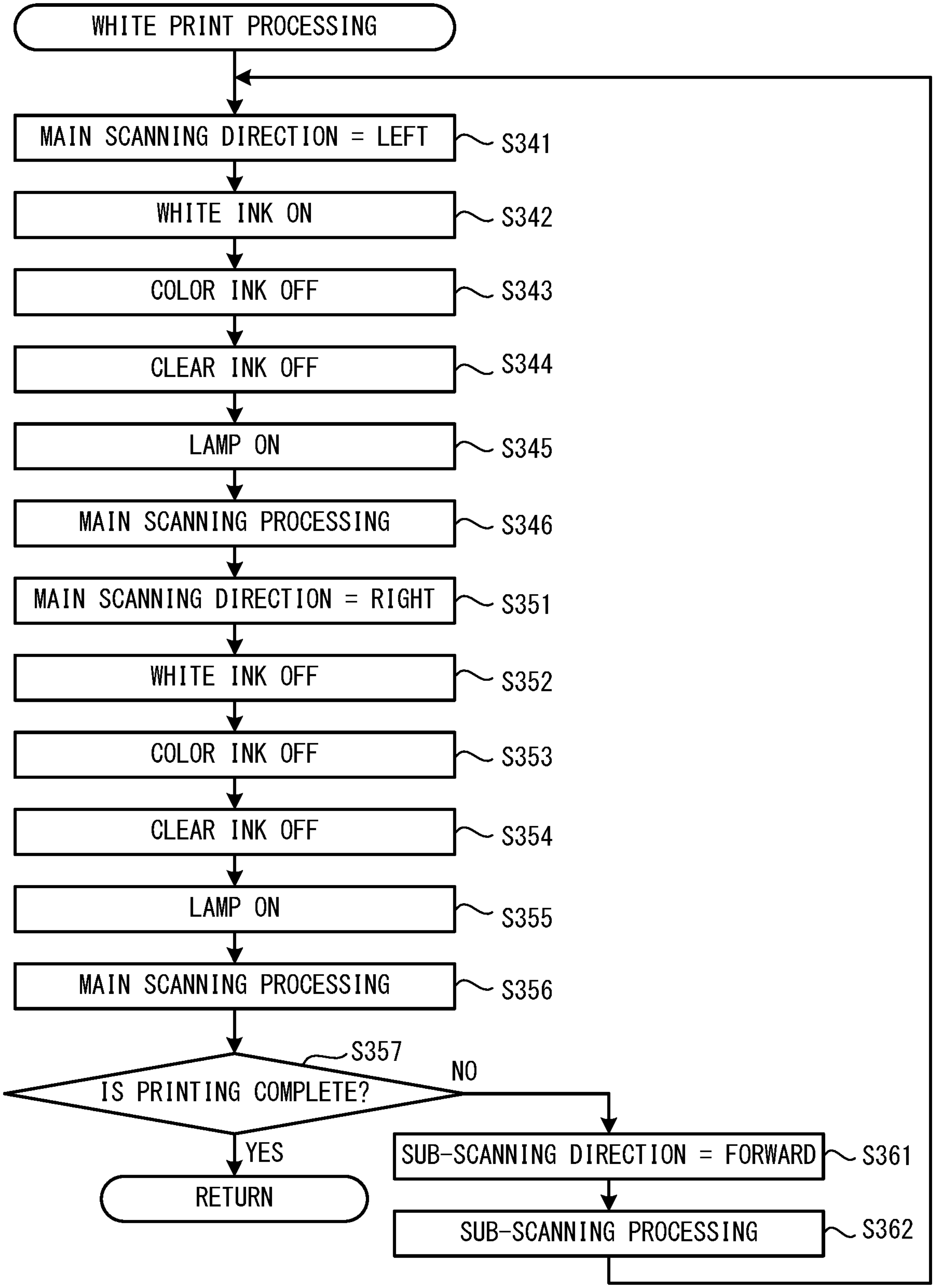
FIG. 20 is a flowchart of the white print processing.

On the other hand, in the gloss print mode, the CPU 41 performs the color print processing at step S325 shown in FIG. 19 with the platen 5 positioned at the raised position P4 shown in FIG. 14. Thus, in the gloss print mode, compared to the normal print mode, the illuminance is small, and thus the smoothing of the color ink layer 102 is more likely to advance. As a result, in the gloss print mode, the color ink layer 102 shown in FIG. 6 does not have the surface unevenness, or has a lesser surface unevenness than the color ink layer 102 shown in FIG. 5.

Figure 22:
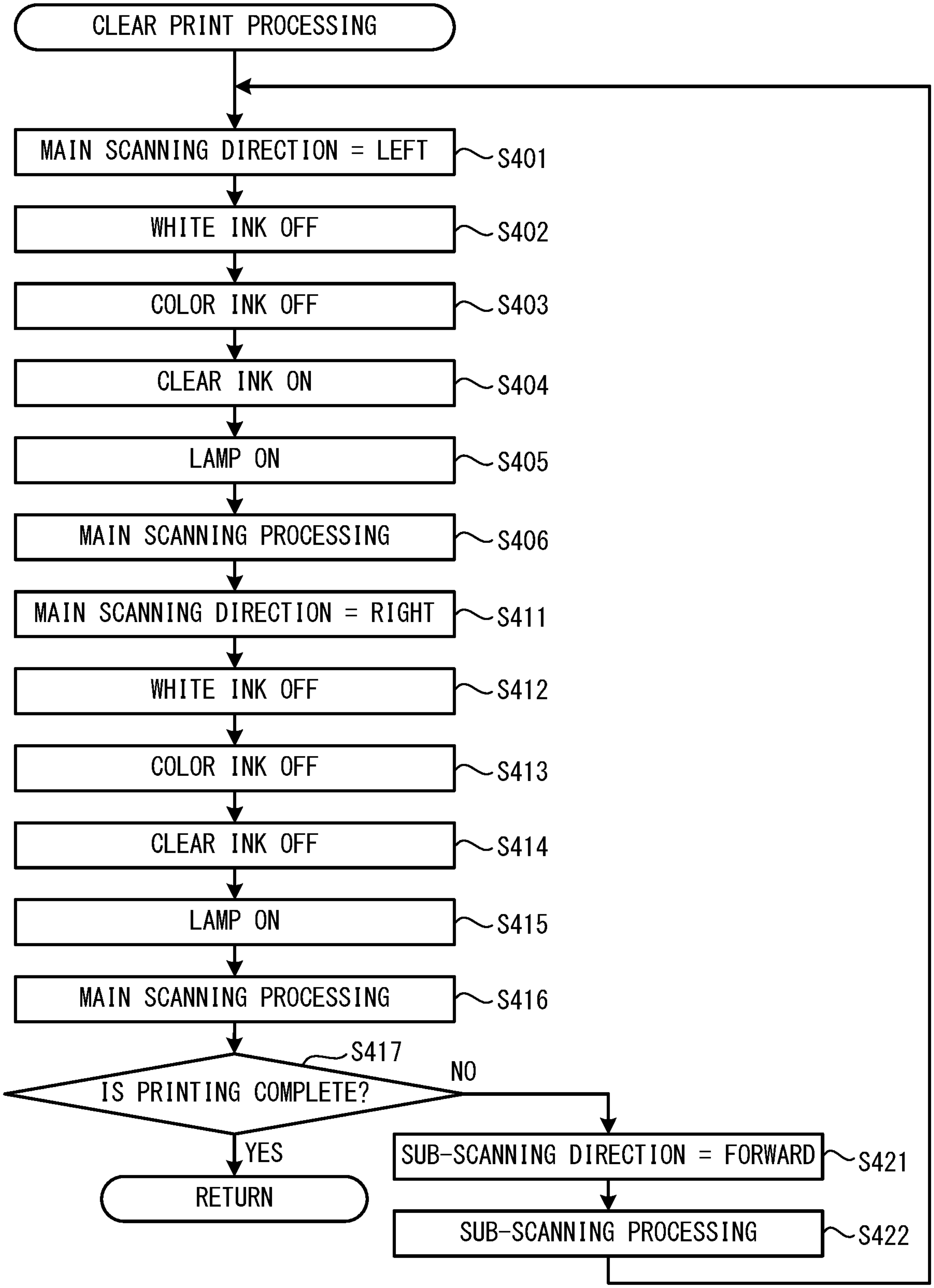
FIG. 22 is a flowchart of clear print processing.

The clear print processing (step S316 or step S326) will be described with reference to FIG. 22. In the clear print processing at step S316 shown in FIG. 18 and the clear print processing at step S326 shown in FIG. 19, the position in the up-down direction of the lamp 60 shown in FIG. 14 is different, and the content of each of the processing is the same. In the normal print mode, the CPU 41 performs the clear print processing at step S316 shown in FIG. 18 with the lamp 60 positioned at the lowered position P3 shown in FIG. 14. In the gloss print mode, the CPU 41 performs the clear print processing at step S326 shown in FIG. 19 with the lamp 60 positioned at the raised position P4 shown in FIG. 14.

When the clear print processing is started, the CPU 41 sets "left" as the main scanning direction (step S401). The CPU 41 sets the white ink to "OFF" (step S402). The CPU 41 sets the color ink to "OFF" (step S403). The CPU 41 sets the clear ink to "ON" (step S404). The CPU 41 sets the lamp 60 to "ON" (step S405).

The CPU 41 performs the main scanning processing on the basis of the settings at step S401 to step S405 (step S406). In the main scanning processing at step S406, in the movement control, the CPU 41 drives the main scanning motor 31 on the basis of the detection result from the encoder 311 shown in FIG. 16, and moves the carriage 20 shown in FIG. 14 to the left from the right end of the printing region 10 to the left end of the printing region 10. While executing the movement control, in the ejection control, the CPU 41 causes the white/clear head 52 shown in FIG. 15 to stop the ejection of the white ink from the nozzle row 52W. While executing the movement control, in the ejection control, the CPU 41 drives the head drive portion 33 shown in FIG. 16 on the basis of the print data, and causes the white/clear head 52 shown in FIG. 15 to eject the clear ink from the nozzle row 52L. While executing the movement control, in the ejection control, the CPU 41 causes the color head 51 shown in FIG. 15 to stop the ejection of the color inks from the nozzle rows 51Y, 51M, 51C, and 51K. While executing the movement control, in the irradiation control, the CPU 41 causes the plurality of ultraviolet light-emitting diodes 604 shown in FIG. 14 to be illuminated, and irradiates the ultraviolet light toward the object to be printed M from the lamp 60. The ultraviolet light from the lamp 60 is irradiated onto the clear ink layer 103 shown in FIG. 5 and FIG. 6.

The CPU 41 sets "right" as the main scanning direction (step S411). The CPU 41 sets the white ink to "OFF" (step S412). The CPU 41 sets the color ink to "OFF" (step S413). The CPU 41 sets the clear ink to "OFF" (step S414). The CPU 41 sets the lamp 60 to "ON" (step S415).

The CPU 41 performs the main scanning processing on the basis of the settings at step S411 to step S415 (step S416). In the main scanning processing at step S416, in the movement control, the CPU 41 drives the main scanning motor 31 on the basis of the detection result from the encoder 311 shown in FIG. 16, and moves the carriage 20 shown in FIG. 14 to the right from the left end of the printing region 10 to the right end of the printing region 10. While executing the movement control, in the ejection control, the CPU 41 causes the white/clear head 52 shown in FIG. 15 to stop the ejection of the white ink from the nozzle row 52W. While executing the movement control, in the ejection control, the CPU 41 causes the white/clear head 52 shown in FIG. 15 to stop the ejection of the clear ink from the nozzle row 52L. While executing the movement control, in the ejection control, the CPU 41 causes the color head 51 shown in FIG. 15 to stop the ejection of the color inks from the nozzle rows 51Y, 51M, 51C, and 51K. While executing the movement control, in the irradiation control, the CPU 41 causes the plurality of ultraviolet light-emitting diodes 604 shown in FIG. 14 to be illuminated, and irradiates the ultraviolet light toward the object to be printed M from the lamp 60. The ultraviolet light from the lamp 60 is irradiated onto the clear ink layer 103 shown in FIG. 5 and FIG. 6.

On the basis of the print data, the CPU 41 determines whether, of the object to be printed M shown in FIG. 5 and FIG. 6, the formation of the clear ink layer 103 is complete on all of the region on which the image is to be printed (step S417). When, of the object to be printed M shown in FIG. 5 and FIG. 6, the formation of the clear ink layer 103 is not complete on all of the region on which the image is to be printed (no at step S417), the CPU 41 sets "forward" as the sub-scanning direction (step S421).

The CPU 41 performs the sub-scanning processing on the basis of the setting at step S421 (step S422). In the sub-scanning processing at step S422, the CPU 41 controls the sub-scanning motor 32 on the basis of the detection result from the encoder 321 shown in FIG. 16, and moves the platen 5 shown in FIG. 14 forward. When the platen 5 shown in FIG. 14 moves forward by the predetermined movement amount, the CPU 41 stops the sub-scanning motor 32 shown in FIG. 16. The CPU 41 shifts the processing to step S401. When, of the object to be printed M shown in FIG. 5 and FIG. 6, the formation of the clear ink layer 103 is complete on all of the region on which the image is to be printed (yes at step S417), the CPU 41 returns the processing to the normal print processing shown in FIG. 18 or to the gloss print processing shown in FIG. 19.

According to the clear print processing (step S316 or step S326), in the N-th main scanning processing at step S406, the clear ink layer 103 (N) is formed on the color ink layer 102, on the object to be printed M shown in FIG. 5 and FIG. 6, by the ejection of the clear ink from the white/clear head 52 shown in FIG. 15. The ultraviolet light generated from the lamp 60 shown in FIG. 15 during the N-th main scanning processing at step S406 is irradiated onto the clear ink layer 103 (N) shown in FIG. 5 and FIG. 6. In this way, the curing of the clear ink layer 103 (N) shown in FIG. 5 and FIG. 6 is promoted. The ultraviolet light generated from the lamp 60 shown in FIG. 15 during the N-th main scanning processing at step S416 is further irradiated onto the clear ink layer 103 (N) shown in FIG. 5 and FIG. 6. In this way, since the amount of ultraviolet light irradiated onto the clear ink layer 103 (N) shown in FIG. 5 and FIG. 6 increases, the printer 1B can reliably cure the clear ink layer 103 (N).

In the manner described above, the clear ink layer 103 is formed on the color ink layer 102, on the object to be printed M shown in FIG. 5 and FIG. 6. Thus, as the ink layer 100, the white ink layer 101, the color ink layer 102, and the clear ink layer 103 are formed from the upper surface of the object to be printed M upward, in order of the white ink layer 101, the color ink layer 102, and the clear ink layer 103.

In the embodiment, the printer 1A adjusts the illuminance by adjusting the position of the platen 5 in the up-down direction. In other words, in the embodiment, the printer 1A adjusts the degree of advancement of the smoothing of the color ink layer 102 and the clear ink layer 103 by adjusting the position of the platen 5 in the up-down direction. In this way, the printer 1A causes printed objects to be different from each other in the normal print mode and the gloss print mode. On the other hand, in the modified example, the printer 1B does not adjust the position of the platen 5 in the up-down direction, and adjusts the position of the lamp 60 in the up-down direction. In this way, the printer 1B can adjust the illuminance, and can adjust the degree of advancement of the smoothing of the color ink layer 102 and the clear ink layer 103.

In the modified example, in the normal print mode, the CPU 41 performs the clear print processing at step S316 shown in FIG. 18 with the lamp 60 positioned at the lowered position P3 shown in FIG. 14. Thus, based on the same principle as for the color print processing at step S315 shown in FIG. 18, in the normal print mode, the illuminance is relatively large. As a result, in the normal print mode, the clear ink layer 103 shown in FIG. 5 has surface unevenness, and the matte finish printed object 100A shown in FIG. 5 is created.

On the other hand, in the gloss print mode, the CPU 41 performs the clear print processing at step S326 shown in FIG. 19 with the lamp 60 positioned at the raised position P4 shown in FIG. 14. Thus, based on the same principle as for the color print processing at step S325 shown in FIG. 19, in the gloss print mode, the illuminance is relatively small. As a result, in the gloss print mode, the clear ink layer 103 shown in FIG. 6 does not have the surface unevenness, or has a lesser surface unevenness than the clear ink layer 103 shown in FIG. 5. As a result, the gloss finish printed object 100B shown in FIG. 6 has a glossier finish than the matte finish printed object 100A shown in FIG. 5. In this way, in the gloss print mode, the gloss finish printed object 100B shown in FIG. 6 is created.

As described above, in the modified example, in the gloss print mode, the white print processing at step S324, the color print processing at step S325, and the clear print processing at step S326 are respectively performed with the lamp 60 positioned at the raised position P4 shown in FIG. 14, that is, in the state in which the irradiation distance L is the second distance L2. Thus, in a similar manner to the embodiment, the printer 1B can suppress the occurrence of the striped pattern in the white ink layer 101, the color ink layer 102, and the clear ink layer 103, respectively. In the normal print mode, the white print processing at step S314, the color print processing at step S315, and the clear print processing at step S316 are respectively performed with the lamp 60 positioned at the lowered position P3, that is, in the state in which the irradiation distance L is the first distance L1. Thus, in a similar manner to the embodiment, the printer 1B can suppress the occurrence of the ink discharge failure by the color head 51 and the white/clear head 52. As a result, the printer 1B can suppress the occurrence of the striped pattern in the ink layer 100 in the gloss print mode, can suppress the ink discharge failure in the normal print mode, and thus improve the print quality.

The direction from the right to the left is the direction from the lamp 60 toward the color head 51 and the white/clear head 52. In the normal print mode and the gloss print mode, in the main scanning processing at step S346, at step S376, or at step S406, when the carriage 20 is moved from the right to the left by the movement control, the color inks are ejected from the color head 51, or the white ink or the clear ink is ejected from the white/clear head 52 by the ejection control. In the main scanning processing at step S346, at step S376, or at step S406, when the carriage 20 is moved from the right to the left by the movement control, the ultraviolet light is irradiated from the lamp 60 onto the white ink layer 101, the color ink layer 102, or the clear ink layer 103 by the irradiation control. In this way, in a similar manner to the embodiment, the printer 1B can both form the ink layer 100 (N) and cure the formed ink layer 100 (N) when moving the carriage 20 from the right to the left for the N-th time. Thus, in the gloss print mode, for example, the printer 1B can shorten the processing time required for the printing, while suppressing the occurrence of the striped pattern in the ink layer 100. In the normal print mode, for example, the printer 1B can shorten the processing time required for the printing while suppressing the ink discharge failure by the color head 51 and the white/clear head 52.

The white/clear head 52 is aligned with the color head 51 in the left-right direction (the main scanning direction). Thus, the printer 1B can irradiate the ultraviolet light onto each of the white ink layer 101, the color ink layer 102, and the clear ink layer 103, using the single lamp 60. As a result, it is not necessary for the printer 1B to be provided with the three lamps 60 for irradiating the ultraviolet light onto each of the white ink layer 101, the color ink layer 102, and the clear ink layer 103. Thus, the printer 1B can suppress an increase in size of the device as a whole.

The printer 1B causes the irradiation distance L to be the first distance L1 or the second distance L2 by moving the housing 601 in the up-down direction. Thus, the printer 1B can change the irradiation distance L while maintaining the distance, in the up-down direction, between the platen 5 and the color head 51, and between the platen 5 and the white/clear head 52, respectively. Thus, the printer 1B can create the matte finish printed object 100A in the normal print mode and can create the gloss finish printed object 100B in the gloss print mode, while causing the print quality to be stable.

Figure 23:
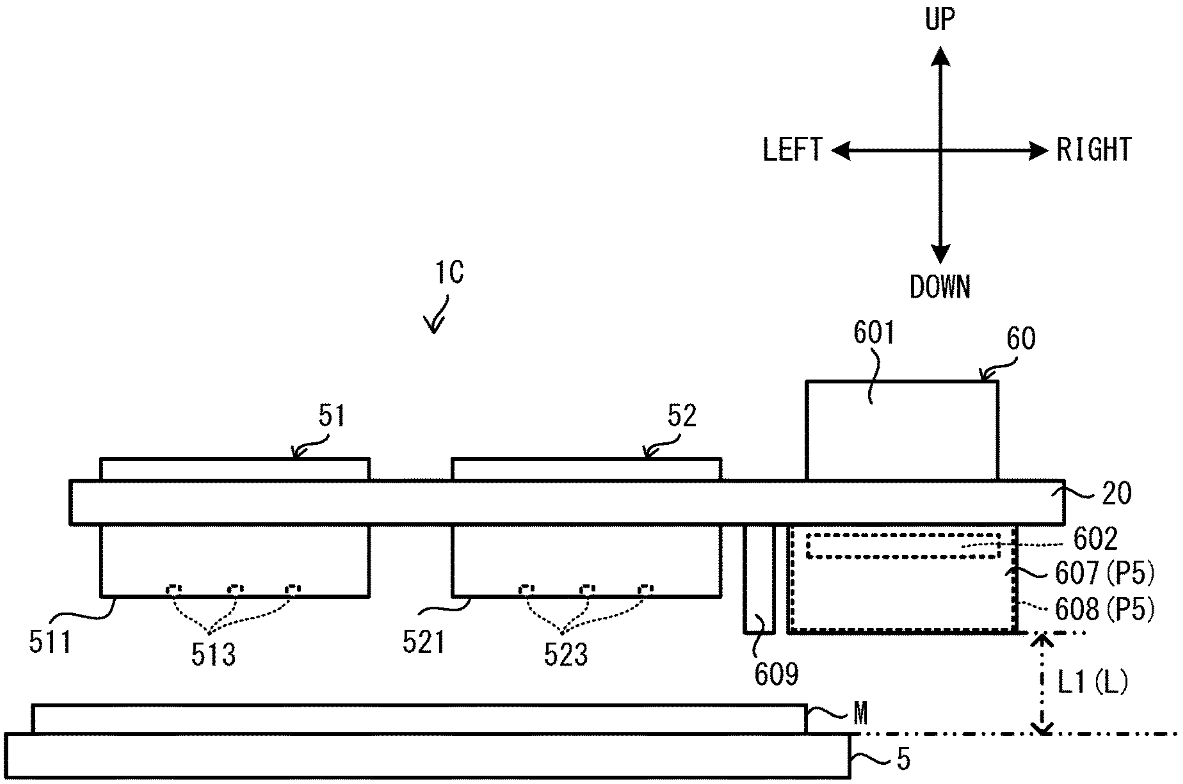
FIG. 23 is a schematic diagram of a printer, as viewed from the front, when light shielding walls are positioned at a lowered position.

A printer 1C according to the other modified example of the present disclosure will be described with reference to FIG. 23 to FIG. 25. In a similar manner to the printer 1A shown in FIG. 1, and the printer 1B shown in FIG. 14, the printer 1C shown in FIG. 23 is an inkjet-type UV printer. The printer 1C differs from the printer 1B in that the lamp 60 is further provided with shielding walls 607, 608, and 609, and the housing 601 is fixed to the carriage 20. The remaining mechanical configuration of the printer 1C is the same as the mechanical configuration of the printer 1B. Hereinafter, in the other modified example, the members that have the same or equivalent functions as those of the above-described modified example are assigned the same or corresponding reference signs as those of the above-described modified example, and a description thereof will be omitted or simplified.

In the printer 1C, each of the shielding walls 607 to 609 is a plate, and blocks the ultraviolet light. The shielding walls 607 and 608 are supported by the carriage 20. The shielding wall 607 is aligned with the front side of the lamp 60 and extends in the up-down direction and the left-right direction. The left end of the shielding wall 607 is positioned further to the left than the left end of the lamp 60. The right end of the shielding wall 607 is positioned further to the right than the right end of the lamp 60. The shielding wall 608 is aligned with the rear side of the lamp 60 and extends in the up-down direction and the left-right direction. The left end of the shielding wall 608 is positioned further to the left than the left end of the lamp 60. The right end of the shielding wall 608 is positioned further to the right than the right end of the lamp 60. The shielding wall 607 and the shielding wall 608 face each other in the front-rear direction with the lamp 60 interposed therebetween.

The shielding wall 609 is fixed to the carriage 20. The shielding wall 609 is aligned with the left side of the lamp 60 and extends in the front-rear direction and the up-down direction. The shielding wall 609 extends downward from the carriage 20. The lower end of the shielding wall 609 is positioned higher than the platen 5. The front end of the shielding wall 609 is positioned further to the front than the front end of the lamp 60. The rear end of the shielding wall 609 is positioned further to the rear than the rear end of the lamp 60. In the left-right direction, the shielding wall 609 is positioned between the lamp 60 and the white/clear head 52.

Figure 24:
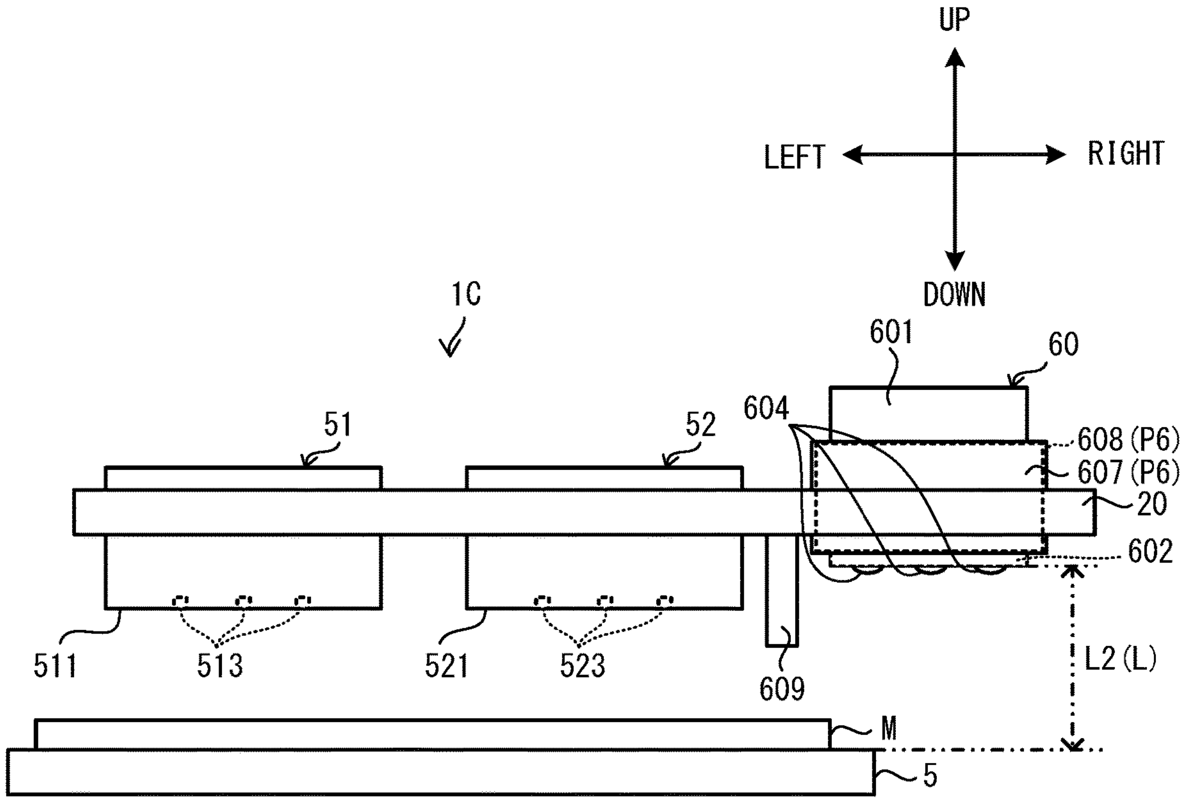
FIG. 24 is a schematic diagram of the printer, as viewed from the front, when the light shielding walls are positioned at a raised position.
Figure 25:
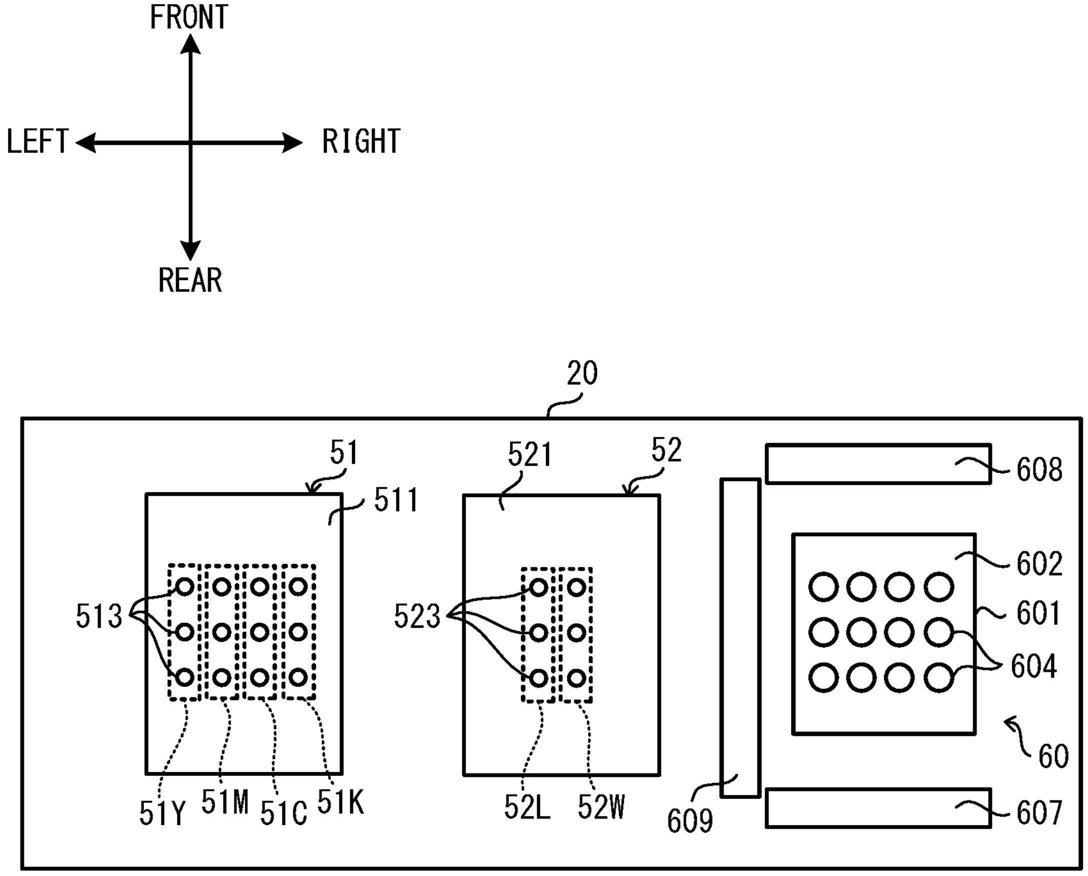
FIG. 25 is a schematic diagram of the carriage according to another modified example, as viewed from below.

The shielding walls 607 and 608 move in the up-down direction between a lowered position P5 shown in FIG. 23 and a raised position P6 shown in FIG. 24. In the other modified example, as shown in FIG. 23, when the shielding walls 607 and 608 are positioned at the lowered position P5, the lower ends of the shielding walls 607 and 608 are positioned at the lower end of the lamp 60. As shown in FIG. 24, when the shielding walls 607 and 608 are positioned at the raised position P6, the lower ends of the shielding walls 607 and 608 are positioned higher than the lower surface of the housing 601. Thus, when the shielding walls 607 and 608 are positioned at the raised position P6, the lower surface of the housing 601 is positioned at the lower end of the lamp 60.

As shown in FIG. 23 and FIG. 24, in the other modified example, the irradiation distance L indicates the distance, in the up-down direction, between the upper surface of the platen 5 and a portion that is positioned lowest, of the lower surface of the housing 601 and the shielding walls 607 and 608. Thus, as shown in FIG. 23, when the shielding walls 607 and 608 are positioned at the lowered position P5, the irradiation distance L indicates the distance, in the up-down direction, between the upper surface of the platen 5 and the lower ends of the shielding walls 607 and 608. The lowered position P5 is a position, in the up-down direction, of the shielding wall 607 when the irradiation distance L is the first distance L1. As shown in FIG. 24, when the shielding walls 607 and 608 are positioned at the raised position P6, the irradiation distance L indicates the distance, in the up-down direction, between the upper surface of the platen 5 and the lower surface of the housing 601. The raised position P6 is a position, in the up-down direction, of the shielding wall 607 when the irradiation distance L is the second distance L2.

The electrical configuration of the printer 1C is the same as that of the printer 1B shown in FIG. 16. In the other modified example, the shielding walls 607 and 608 are moved in the up-down direction by the driving of the raising/lowering motor 35 shown in FIG. 16. In the printer 1C, in place of the main processing shown in FIG. 17, the CPU 41 performs the main processing in which determination content at step S311 and step S321, and processing content at step S312 and step S322 shown in FIGS. 18 and 19 are different. In the other modified example, the remaining processing of the main processing is the same as the main processing shown in FIG. 17.

In the main processing according to the other modified example, at step S311 shown in FIG. 18, the CPU 41 determines, on the basis of the detection result from the encoder 351 shown in FIG. 16, whether or not the shielding walls 607 and 608 are positioned at the lowered position P5 shown in FIG. 23 (step S311). When the shielding walls 607 and 608 are positioned at the lowered position P5 shown in FIG. 23 (yes at step S311), the CPU 41 shifts the processing to step S313.

When the shielding walls 607 and 608 are not positioned at the lowered position P5 shown in FIG. 23 (no at step S311), at step S312 shown in FIG. 18, the CPU 41 controls the raising/lowering motor 35 on the basis of the detection result from the encoder 351 shown in FIG. 16, and moves the shielding walls 607 and 608 to the lowered position P5 shown in FIG. 23 (step S312). In this way, the irradiation distance L becomes the first distance L1 shown in FIG. 23. The CPU 41 shifts the processing to step S313 shown in FIG. 18.

In the main processing according to the other modified example, at step S321 shown in FIG. 19, the CPU 41 determines, on the basis of the detection result from the encoder 351 shown in FIG. 16, whether or not the shielding walls 607 and 608 are positioned at the raised position P6 shown in FIG. 24 (step S321). When the shielding walls 607 and 608 are positioned at the raised position P6 shown in FIG. 24 (yes at step S321), the CPU 41 shifts the processing to step S323 shown in FIG. 19.

When the shielding walls 607 and 608 are not positioned at the raised position P6 shown in FIG. 24 (no at step S321), at step S322 shown in FIG. 19, the CPU 41 controls the raising/lowering motor 35 on the basis of the detection result from the encoder 351 shown in FIG. 16, and moves the shielding walls 607 and 608 to the raised position P6 shown in FIG. 24 (step S322). In this way, the irradiation distance L becomes the second distance L2 shown in FIG. 24. The CPU 41 shifts the processing to step S323 shown in FIG. 19.

In the embodiment, the printer 1A adjusts the position of the platen 5 in the up-down direction. In the modified example, the printer 1B adjusts the position of the lamp 60 in the up-down direction. In this way, the printer 1A and the printer 1B adjust the illuminance, and adjust the degree of advancement of the smoothing of the color ink layer 102 and the clear ink layer 103. On the other hand, in the other modified example, the printer 1C adjusts the position of the shielding walls 607 and 608 in the up-down direction. In this way, the printer 1C can adjust the illuminance, and can adjust the degree of advancement of the smoothing of the color ink layer 102 and the clear ink layer 103.

In the other modified example, in the normal print mode, the CPU 41 performs the white print processing at step S314, the color print processing at step S315, and the clear print processing at step S316, all shown in FIG. 18, in the state in which the shielding walls 607 and 608 are positioned at the lowered position P5 shown in FIG. 23. Thus, in the normal print mode, the irradiation distance L is relatively small, and thus the illuminance is relatively large. As a result, in the normal print mode, the white ink layer 101, the color ink layer 102, and the clear ink layer 103 shown in FIG. 5 have surface unevenness, and the matte finish printed object 100A shown in FIG. 5 is created.

On the other hand, in the gloss print mode, the CPU 41 performs the white print processing at step S324, the color print processing at step S325, and the clear print processing at step S326, all shown in FIG. 19, in the state in which the platen 5 is positioned at the raised position P6 shown in FIG. 24. Thus, in the gloss print mode, the irradiation distance L is relatively large, and thus the illuminance is relatively small. As a result, in the gloss print mode, the white ink layer 101, the color ink layer 102, and the clear ink layer 103 shown in FIG. 6 do not have the surface unevenness, or have a lesser surface unevenness than the white ink layer 101, the color ink layer 102, and the clear ink layer 103 shown in FIG. 5. Thus, the gloss finish printed object 100B shown in FIG. 6 has a glossier finish than the matte finish printed object 100A shown in FIG. 5. In this way, in the gloss print mode, the gloss finish printed object 100B shown in FIG. 6 is created.

As described above, in the other modified example, the printer 1C causes the irradiation distance L to be the first distance L1 or the second distance L2 by moving the shielding walls 607 and 608 in the up-down direction. Thus, the printer 1C can change the irradiation distance L while maintaining the distance, in the up-down direction, between the platen 5 and the color head 51, and between the platen 5 and the white/clear head 52, respectively. Thus, the printer 1C can create the matte finish printed object 100A in the normal print mode and can create the gloss finish printed object 100B in the gloss print mode, while causing the print quality to be stable. Furthermore, even when the shielding walls 607 and 608 move in the up-down direction, the position of the housing 601 does not change in the up-down direction. Thus, when changing the irradiation distance L, the printer 1C can inhibit the housing 601 from colliding with members above the housing 601. As a result, the printer 1C can effectively utilize the space above the housing 601.

Hereinafter, when the embodiment, the modified example, and the other modified example are collectively referred to, or when no particular distinction is made therebetween, they will be referred to as "the above-described embodiments." The present disclosure can make various modifications from the above-described embodiments. Various modified examples to be described below can be respectively combined insofar as no contradictions arise. For example, both a mechanism for moving the platen 5 in the front-rear direction, and a mechanism for moving the carriage 20 in the left-right direction are not restricted to the above-described embodiments. For example, in place of motors, the printer 1A, the printer 1B, and the printer 1C may move various members, such as the platen 5 and the carriage 20, using a cylinder or the like. The printer 1A, the printer 1B, and the printer 1C may be provided with a configuration that moves the platen 5 in the left-right direction with respect to the carriage 20.

In the embodiment, the color side lamp 61 may be provided to the left of the color head 51. The printer 1A may be provided with a plurality of the color side lamps 61. For example, the plurality of color side lamps 61 may be provided on both the right and left sides of the color head 51. The white/clear side lamp 62 can be changed in the same manner as the color side lamp 61. In the modified example and the other modified example, the lamp 60 may be provided between the color head 51 and the white/clear side lamp 62 in the left-right direction, or may be provided to the left of the color head 51. The printer 1B and the printer 1C may be provided with a plurality of the lamps 60. For example, the plurality of lamps 60 may be provided to the left of the color head 51 and to the right of the white/clear side lamp 62.

When the plurality of color side lamps 61, the plurality of white/clear side lamps 62, or the plurality of lamps 60 are provided, so-called bi-directional printing may be performed. In other words, the CPU 41 may control the color head 51 and the white/clear head 52 to eject the ink when the carriage 20 moves from the right to the left also. For example, at step S152, the CPU 41 sets the white ink to "ON," at step S213, the CPU 41 sets the color ink to "ON," and at step S214, the CPU 41 sets the clear ink to "ON." In this case, after step S147, the CPU 41 may move the platen 5 forward by the predetermined movement amount when the formation of the white ink layer 101 is not complete. After step S207, the CPU 41 may move the platen 5 rearward by the predetermined movement amount when the formation of the color ink layer 102 and the clear ink layer 103 is not complete.

The color head 51 and the white/clear head 52 may be line heads. In this case, the carriage 20 is fixed so as not to move. The color head 51 and the white/clear head 52 are aligned in the front-rear direction. The nozzles 51Y, 51M, 51C, and 51K are configured by the plurality of nozzles 513 being aligned in a single row in the left-right direction. The nozzle rows 52L and 52W are configured by the plurality of nozzles 523 being aligned in a single row in the left-right direction. It is sufficient that the printer 1A be provided with one of the color side lamp 61 or the white/clear side lamp 62. In the printer 1A, the one of the color side lamp 61 or the white/clear side lamp 62 is aligned to one of the rear or the front of the color head 51 and the white/clear head 52, or to both the rear and the front thereof. In the printer 1B and the printer 1C, the lamp 60 is aligned to one of the rear or the front of the color head 51 or the white/clear head 52, or to both the rear and the front thereof. The color head 51 and the white/clear head 52 move in the front-rear direction relative to the platen 5 as a result of the platen 5 moving in the front-rear direction.

As long as the ink is cured by being irradiated with light, the printer 1A, the printer 1B, and the printer 1C may employ an ink that is cured by being irradiated with visible light or infrared light, for example. In this case, the color side lamp 61, the white/clear side lamp 62, and the lamp 60 emit the visible light or the infrared light. The color side lamp 61, the white/clear side lamp 62, and the lamp 60 may be incandescent lamps, mercury lamps, fluorescent lamps, or the like.

In the embodiment, at step S111 and step S121, the CPU 41 identifies the irradiation distance L on the basis of the detection result from the encoder 341. In the modified example and the other modified example, at step S311 and step S321, the CPU 41 identifies the irradiation distance L on the basis of the detection result from the encoder 351. In contrast to this, for example, the printer 1A, the printer 1B, and the printer 1C may be provided with a sensor for detecting the irradiation distance L. The sensor may be an optical sensor, an image sensor, a switch sensor, or the like. In this case, the CPU 41 may identify the irradiation distance L on the basis of a detection result from the sensor. For example, the user may operate the operation portion 37, or operate an external device, and input the irradiation distance L into the printer 1A. In this case, the CPU 41 may acquire the input irradiation distance L, and perform the determination at step S311 and step S321 on the basis of the acquired irradiation distance L.

In the above-described embodiments, the first distance L1 may be a specific single value, or may be configured such that one of a plurality of continuous values is set as the first distance L1. As long as it is a larger value than the first distance L1, the second distance L2 may also be a specific single value, or may be configured such that one of a plurality of continuous values is set as the second distance L2.

In the above-described embodiments, in both the normal print mode and the gloss print mode, the three layers of the white ink layer 101, the color ink layer 102, and the clear ink layer 103 are layered to form the ink layer 100. In contrast to this, in either both or one of the normal print mode and the gloss print mode, the printer 1A, the printer 1B, and the printer 1C may form layers of some of the white ink layer 101, the color ink layer 102, and the clear ink layer 103. For example, in the gloss print mode, when the printer 1A omits the formation of the clear ink layer 103, at step S204, the CPU 41 may set the clear ink to "OFF."

In the embodiment, in the white print processing, it is sufficient that the CPU 41 set the white/clear side lamp 62 to "ON" for at least one of when the CPU 41 sets "left" as the main scanning direction and when the CPU 41 sets "right" as the main scanning direction. In the color/clear print processing, it is sufficient that the CPU 41 set the color side lamp 61 to "ON" for at least one of when the CPU 41 sets "left" as the main scanning direction, and when the CPU 41 sets "right" as the main scanning direction.

In the modified example and the other modified example, it is sufficient that the CPU 41 set the lamp 60 to "ON" for at least one of when the CPU 41 sets "left" as the main scanning direction and when the CPU 41 sets "right" as the main scanning direction. For example, when the CPU 41 sets "left" as the main scanning direction, the CPU 41 may set the lamp 60 to "OFF." In this case, the printer 1B and the printer 1C irradiate the ultraviolet light onto the ink layer 100 in the main scanning processing for which "right" is set as the main scanning direction. The CPU 41 may set the lamp 60 to "OFF" when the CPU 41 sets "right" as the main scanning direction.

In the embodiment, the processing content of the white print processing at step S114 and the processing content of the white print processing at step S124 may differ from each other. The processing content of the color/clear print processing at step S115 and the processing content of the color/clear print processing at step S125 may differ from each other. For example, in the color/clear print processing at step S115, at step S205, the white/clear side lamp 62 may be set to "OFF," and at step S206, the color side lamp 61 may set be "OFF," while in the color/clear print processing at step S125, at step S205, the white/clear side lamp 62 may be set to "ON" and at step S206, the color side lamp 61 may be set to "ON."

In the modified example and the other modified example, the processing content of the white print processing at step S314 and the processing content of the white print processing at step S324 may differ from each other. The processing content of the color print processing at step S315 and the processing content of the color print processing at step S325 may differ from each other. The processing content of the clear print processing at step S316 and the processing content of the clear print processing at step S326 may differ from each other.

In the above-described embodiments, the printer 1A, the printer 1B, and the printer 1C may form the white ink layer 101 while moving the platen 5 rearward. The printer 1A, the printer 1B, and the printer 1C may form the color ink layer 102 while moving the platen 5 forward. The printer 1B, and the printer 1C may form the clear ink layer 103 while moving the platen 5 rearward. The printer 1A may form the clear ink layer 103 on the color ink layer 102, on the object to be printed M, after forming the color ink layer 102 on all of the region on which the image is to be printed, of the object to be printed M. In this case, the printer 1A may form the color ink layer 102 while moving the platen 5 forward. The printer 1A may form the clear ink layer 103 while moving the platen 5 forward.

In the embodiment, in the gloss print mode, for example, the CPU 41 may set the white/clear side lamp 62 to "OFF" at step S145, when forming the white ink layer 101. In this case, the ultraviolet light is not irradiated onto the white ink layer 101 (N) in the N-th main scanning processing at step S147, and the ultraviolet light is irradiated onto the white ink layer 101 (N) in the N+K-th main scanning processing at step S147. In this way, a time period from forming the white ink layer 101 to the irradiation of the white ink layer 101 with the ultraviolet light becomes longer. Thus, the printer 1A more easily secures the time for smoothing the white ink layer 101. In a similar manner, when the clear ink layer 103 is formed on the color ink layer 102, on the object to be printed M, after forming the color ink layer 102 on all of the region on which the image is to be printed, of the object to be printed M, the CPU 41 may perform the following control. In other words, in the gloss print mode, for example, when forming the clear ink layer 103, the CPU 41 may perform control such that the ultraviolet light from the white/clear side lamp 62 is not irradiated onto the clear ink layer 103, and the ultraviolet light from the color side lamp 61 is irradiated onto the clear ink layer 103. In this case, after the main scanning processing, the CPU 41 sets "forward" as the sub-scanning direction, that is, the direction from the white/clear head 52 toward the color head 51, and performs the sub-scanning processing. In the gloss print mode, for example, when forming the color ink layer 102, the CPU 41 may perform control such that the ultraviolet light from the color side lamp 61 is not irradiated onto the color ink layer 102, and the ultraviolet light from the white/clear side lamp 62 is irradiated onto the color ink layer 102. In this case, it is sufficient that the printer 1A form the color ink layer 102 while moving the platen 5 rearward, that is, in the direction from the color head 51 toward the white/clear head 52.

In the above-described embodiments, the printer 1A, the printer 1B, and the printer 1C may change the types or a number of types of color of the ink ejected by the color head 51 and the white/clear head 52 as appropriate. For example, the color head 51 may eject the white ink, or may eject the clear ink, in addition to the color inks. For example, the printer 1A, the printer 1B, and the printer 1C may be provided with three or more heads, such as a head that ejects the color inks, a head that ejects the white ink, and a head that ejects the clear ink.

In the embodiment, the printer 1A may move the carriage 20 in the up-down direction. In this case, at step S112 or step S122, the CPU 41 may move the carriage 20 in the up-down direction such that the irradiation distance L becomes the first distance L1 or the second distance L2. The printer 1A may move the color side lamp 61 and the white/clear side lamp 62 separately or together in the up-down direction. In this case, at step S112 or step S122, the CPU 41 may move the color side lamp 61 and the white/clear side lamp 62 in the up-down direction such that the irradiation distance L becomes the first distance L1 or the second distance L2. At step S112 or step S122, the CPU 41 may move the color side lamp 61 in the up-down direction such that the irradiation distance L of the color side lamp 61 becomes the first distance L1 or the second distance L2. At step S112 or step S122, the CPU 41 may move the white/clear side lamp 62 in the up-down direction such that the irradiation distance L of the white/clear side lamp 62 becomes the first distance L1 or the second distance L2.

In the embodiment, in the up-down direction, the respective positions of the plurality of ultraviolet light-emitting diodes 614 and the plurality of ultraviolet light-emitting diodes 624 may be different from each other. In this case, it is sufficient that the irradiation distance L be established using one of the plurality of ultraviolet light-emitting diodes 614 or the plurality of ultraviolet light-emitting diodes 624 as a reference. For example, in the printer 1A, when separately moving the color side lamp 61 and the white/clear side lamp 62 in the up-down direction, the first distance L1 and the second distance L2 of the color side lamp 61 may be set to be the same as the first distance L1 and the second distance L2 of the white/clear side lamp 62, or may be different from each other.

In the embodiment, in the gloss print mode, as long as the CPU 41 performs at least one of the main scanning processing at step S147, step S157, step S207, or step S217 in the state of the irradiation distance L being the second distance L2, the CPU 41 may perform the other processing in the state in which the irradiation distance L is the second distance L2. For example, when the clear ink layer 103 is the uppermost layer, in the gloss print mode, of the main scanning processing at step S147, step S157, step S207, and step S217, the CPU 41 preferably performs one or both of the main scanning processing at step S207 and step S217 in the state in which the irradiation distance L is the second distance L2. This is because the printer 1A can thus suppress the occurrence of the striped patter in the uppermost layer (the clear ink layer 103). In a similar manner, in the modified example and the other modified example, in the gloss print mode, as long as the CPU 41 performs at least one of the main scanning processing at step S346, step S356, step S376, step S386, step S406, or step S416 in the state in which the irradiation distance L being the first distance L1, the CPU 41 may perform the other processing in the state of the irradiation distance L being the first distance L1. For example, when the clear ink layer 103 is the uppermost layer, in the gloss print mode, of the main scanning processing at step S346, step S356, step S376, step S386, step S406, or step S416, the CPU 41 preferably performs one or both of the main scanning processing at step S406 and step S416 in the state in which the irradiation distance L is the second distance L2. For example, when the color ink layer 102 is the uppermost layer, of the main scanning processing at step S346, step S356, step S376, or step S386, the CPU 41 preferably performs one or both of the main scanning processing at step S376 and step S386 in the state in which the irradiation distance L is the second distance L2.

In the embodiment, the printer 1A may move the platen 5 in the up-down direction using a cylinder or the like in place of the raising/lowering motor 34. The raising/lowering mechanism 8 may be a cam mechanism, a ball screw, or the like.

In the modified example, the printer 1B may move the lamp 60 in the up-down direction using a cylinder or the like in place of the raising/lowering motor 35. The printer 1B may move the substrate 602 in the up-down direction with respect to the housing 601. In this case, at step S312 or step S322, it is sufficient that the CPU 41 perform the control such that, as the irradiation distance L, the distance from the upper surface of the platen 5 to the substrate 602 becomes the first distance L1 or the second distance L2. In the modified example, at step S312 or step S322, the CPU 41 may perform the control by moving the platen 5 in the up-down direction instead of the lamp 60, such that the irradiation distance L becomes the first distance L1 or the second distance L2.

In the other modified example, the printer 1C may move the shielding walls 607 and 608 in the up-down direction using a cylinder or the like in place of the raising/lowering motor 35. The shielding walls 607 and 608 may be supported by the housing 601 instead of the carriage 20. The shielding wall 609 may be fixed to the housing 601 instead of to the carriage 20.

In the other modified example, when the shielding walls 607 and 608 are positioned at the raised position P6, the lower ends of the shielding walls 607 and 608 may be positioned lower than the lower surface of the housing 601. In this case, the irradiation distance L indicates a distance, in the up-down direction, between the upper surface of the platen 5 and the lower ends of the shielding walls 607 and 608.

In the embodiment, in the color side lamp 61, the substrate 612 and the plurality of ultraviolet light-emitting diodes 614 may be housed in the housing 611. For example, the lower surface of the substrate 612 may be positioned higher than the lower surface of the housing 611. The white/clear side lamp 62 can be changed in a similar manner to the color side lamp 61. In the modified example and the other modified example also, the lamp 60 can be changed in a similar manner to the color side lamp 61.

In the embodiment, the color side lamp 61 need not necessarily include the housing 611. The white/clear side lamp 62 also need not necessarily include the housing 621. In other words, the substrates 612 and 622 may be exposed in the up-down direction, the left-right direction, and the front-rear direction.

In the embodiment, the white/clear head 52 may be positioned on a front side of the color head 51. The white/clear head 52 may be positioned at a position displaced to the left or to the right with respect to the color head 51, at the front or the rear of the color head 51. In the modified example and the other modified example, the white/clear head 52 may be aligned to the left of the color head 51.

The setting to perform the illumination in the main scanning processing may refer to at least one of the plurality of ultraviolet light-emitting diodes 614 or at least one of the plurality of ultraviolet light-emitting diodes 624 being constantly illuminated or being illuminated at a predetermined timing. The number of the ultraviolet light-emitting diodes 604 may be one, rather than the plurality. The number of the ultraviolet light-emitting diodes 614 may be one, rather than the plurality. The number of the ultraviolet light-emitting diodes 624 may be one, rather than the plurality thereof.

What is claimed is:

1. A printer comprising:

a platen configured to have an object to be printed placed thereon;

a first head configured to eject a first ink onto the object to be printed, the first ink being a photocurable ink;

a second head configured to eject a photocurable second ink onto the object to be printed;

an illumination device aligned with the first head and the second head in a main scanning direction, and including a light source configured to irradiate light onto the object to be printed;

a processor; and a memory storing computer-readable instructions that, when executed by the processor, instruct the processor to perform processes comprising:

normal moving the first head, the second head, and the illumination device relatively with respect to the platen in the main scanning direction in a normal print mode, in a state in which, in a height direction orthogonal to the main scanning direction, a distance between the platen and a predetermined position of the illumination device in the height direction is a first distance;

normal ejecting the ink onto the object to be printed from one or both of the first head and the second head, during the normal moving;

normal irradiating the light from the light source onto the ink ejected onto the object to be printed, during the normal moving;

gloss moving the first head, the second head, and the illumination device relatively with respect to the platen in the main scanning direction in a gloss print mode different from the normal print mode, in a state in which the distance between the platen and the predetermined position in the height direction is a second distance larger than the first distance;

gloss ejecting the ink onto the object to be printed from one or both of the first head and the second head during the gloss moving; and gloss illuminating the light from the light source onto the ink ejected onto the object to be printed.

2. The printer according to claim 1, wherein the normal moving includes a first normal moving, the first normal moving moves the first head, the second head, and the illumination device relatively with respect to the platen in a direction from the illumination device toward the first head, of the main scanning direction, the gloss moving includes a first gloss moving, the first gloss moving moves the first head, the second head, and the illumination device relatively with respect to the platen in the direction from the illumination device toward the first head, of the main scanning direction, the normal ejecting and the normal irradiating are performed during the first normal moving, in the normal print mode, and the gloss ejecting and the gloss irradiating are performed during the first gloss moving, in the gloss print mode.

3. The printer according to claim 1, wherein the second head is aligned with the first head in the main scanning direction, and the irradiation device is a single lamp including the light source.

4. The printer according to claim 1, wherein the second head is aligned with the first head in a direction orthogonal to the main scanning direction and the height direction, the illumination device includes a first lamp and a second lamp, the first lamp is aligned with the first head in the main scanning direction and includes the light source, and the second lamp is aligned with the second head in the main scanning direction and includes the light source.

5. The printer according to claim 1, wherein the illumination device includes a housing including the light source, and the computer-readable instructions further instruct the processor to perform process comprising:

moving the housing in the height direction such that the distance in the height direction between the platen and the light source as the predetermined position, to be the first distance or the second distance.

6. The printer according to claim 1, wherein the illumination device includes a housing and a pair of walls, the housing includes the light source, and the pair of walls is configured to move to an advanced position and a retracted position in the height direction, the walls are positioned in a direction orthogonal to the main scanning direction and the height direction with respect to the housing, the predetermined position is a position of the housing or the pair of walls, for which the distance from the platen in the height direction is closest, when the pair of walls is positioned at the advanced position, the distance between the platen and the predetermined position in the height direction is the first distance, when the pair of walls is positioned at the retracted position, the distance between the platen and the predetermined position in the height direction is the second distance, and the computer-readable instructions further instruct the processor to perform process comprising:

moving the pair of walls between the advanced position and the retracted position such that the distance between the platen and the predetermined position in the height direction to be the first distance or the second distance.

7. The printer according to claim 1, wherein the computer-readable instructions further instruct the processor to perform process comprising:

moving the platen in the height direction such that the distance in the height direction between the platen and the light source, as the predetermined position, to be the first distance or the second distance.

8. The printer according to claim 1, wherein the first head ejects the first ink that is ultraviolet curable, the second head ejects the second ink that is ultraviolet curable, and the illumination device irradiates ultraviolet light.

9. The printer according to claim 1, wherein the first head ejects a color ink as the first ink, and the second head ejects, as the second ink, a clear ink having a higher optical transparency than the color ink.

10. The printer according to claim 9, wherein the second head further ejects a white ink as a third ink.

11. A control method for controlling a printer including a platen configured to have an object to be printed placed thereon, a first head configured to eject a first ink onto the object to be printed, the first ink being a photocurable ink, a second head configured to eject a photocurable second ink onto the object to be printed, and an illumination device aligned with the first head and the second head in a main scanning direction and including a light source configured to irradiate light onto the object to be printed, the method comprising steps of:

normal moving the first head, the second head, and the illumination device relatively with respect to the platen in the main scanning direction in a normal print mode, in a state in which, in a height direction orthogonal to the main scanning direction, a distance between the platen and a predetermined position of the illumination device in the height direction is a first distance;

normal ejecting the ink onto the object to be printed from one or both of the first head and the second head, during the normal moving;

normal irradiating the light from the light source onto the ink ejected onto the object to be printed, during the normal moving;

gloss moving the first head, the second head, and the illumination device relatively with respect to the platen in the main scanning direction in a gloss print mode different from the normal print mode, in a state in which the distance between the platen and the predetermined position in the height direction is a second distance larger than the first distance;

gloss ejecting the ink onto the object to be printed from one or both of the first head and the second head during the gloss moving; and gloss irradiating the light from the light source onto the ink ejected onto the object to be printed, during the gloss moving.

12. A non-transitory computer-readable medium storing computer-readable instructions that are executed by a processor provided in a printer including a platen configured to have an object to be printed placed thereon, a first head configured to eject a first ink onto the object to be printed, the first ink being a photocurable ink, a second head configured to eject a photocurable second ink onto the object to be printed, and an illumination device aligned with the first head and the second head in a main scanning direction and including a light source configured to irradiate light onto the object to be printed, the computer-readable instructions instructing the processor to perform processes comprising:

normal moving the first head, the second head, and the illumination device relatively with respect to the platen in the main scanning direction in a normal print mode, in a state in which, in a height direction orthogonal to the main scanning direction, a distance between the platen and a predetermined position of the illumination device in the height direction is a first distance;

normal ejecting the ink onto the object to be printed from one or both of the first head and the second head during the normal moving;

normal irradiating the light from the light source onto the ink ejected onto the object to be printed, during the normal moving;

gloss moving the first head, the second head, and the illumination device relatively with respect to the platen in the main scanning direction in a gloss print mode different from the normal print mode, in a state in which the distance between the platen and the predetermined position in the height direction is a second distance larger than the first distance;

gloss ejecting the ink onto the object to be printed from one or both of the first head and the second head during the gloss moving; and gloss irradiating the light from the light source onto the ink ejected onto the object to be printed, during the gloss moving.

* * * * *